United States Patent
Piry et al.

(10) Patent No.: US 11,263,014 B2
(45) Date of Patent: Mar. 1, 2022

(54) SHARING INSTRUCTION ENCODING SPACE BETWEEN A COPROCESSOR AND AUXILIARY EXECUTION CIRCUITRY

(71) Applicant: Arm Limited, Cambridge (GB)

(72) Inventors: Frederic Claude Marie Piry, Cagnes-sur-Mer (FR); Thomas Christoper Grocutt, Cambridge (GB); Simon John Craske, Cambridge (GB); Carlo Dario Fanara, Antibes (FR); Jean Sébastien Leroy, Alpes-Maritimes (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/531,295

(22) Filed: Aug. 5, 2019

(65) Prior Publication Data
US 2021/0042124 A1    Feb. 11, 2021

(51) Int. Cl.
*G06F 9/30*     (2018.01)
*G06F 9/38*     (2018.01)

(52) U.S. Cl.
CPC ...... *G06F 9/30181* (2013.01); *G06F 9/30145* (2013.01); *G06F 9/30189* (2013.01); *G06F 9/3877* (2013.01)

(58) Field of Classification Search
CPC ............. G06F 9/30145; G06F 9/30196; G06F 9/30181; G06F 9/3877; G06F 9/3879; G06F 9/3881; G06F 9/30189; G06F 9/3836
See application file for complete search history.

(56) References Cited

U.S. PATENT DOCUMENTS

| | | | | |
|---|---|---|---|---|
| 5,119,499 A | * | 6/1992 | Tonomura | G06F 9/3877 712/34 |
| 5,303,358 A | * | 4/1994 | Baum | G06F 9/3001 712/226 |

(Continued)

FOREIGN PATENT DOCUMENTS

| | | |
|---|---|---|
| EP | 2 562 639 | 2/2013 |
| GB | 2 402 764 | 12/2004 |

OTHER PUBLICATIONS

Arm (Arm Custom Instructions: Enabling Innovation and Greater Flexibility on Arm); White Paper; Feb. 2020; 8 pages (Year: 2020).*

(Continued)

*Primary Examiner* — Keith E Vicary
(74) *Attorney, Agent, or Firm* — Nixon & Vanderhye P.C.

(57) ABSTRACT

Data processing apparatuses, methods of data processing, and non-transitory computer-readable media on which computer-readable code is stored defining logical configurations of processing devices are disclosed. In an apparatus, fetch circuitry retrieves a sequence of instructions and execution circuitry performs data processing operations with respect to data values in a set of registers. An auxiliary execution circuitry interface and a coprocessor interface to provide a connection to a coprocessor outside the apparatus are provided. Decoding circuitry generates control signals in dependence on the instructions of the sequence of instructions, wherein the decoding circuitry is responsive to instructions in a first subset of an instruction encoding space to generate the control signals to control the execution circuitry to perform the first data processing operations, and the decoding circuitry is responsive to instructions in a second subset of the instruction encoding space to generate the control signals in dependence on a configuration condition: to generate the control signals for the auxiliary execution circuitry interface when the configuration condition has (Continued)

a first state; and to generate the control signals for the coprocessor interface when the configuration condition has a second state.

23 Claims, 12 Drawing Sheets

(56) References Cited

U.S. PATENT DOCUMENTS

| | | | | |
|---|---|---|---|---|
| 5,781,750 A * | 7/1998 | Blomgren | ............ | G06F 9/30145 703/26 |
| 5,909,565 A * | 6/1999 | Morikawa | ............. | G06F 9/3885 712/200 |
| 6,014,735 A * | 1/2000 | Chennupaty | ........ | G06F 9/30149 712/210 |
| 6,202,145 B1 * | 3/2001 | Barnes | .................... | G06F 9/268 703/23 |
| 6,247,113 B1 * | 6/2001 | Jaggar | ................. | G06F 9/30098 712/200 |
| 6,327,647 B1 * | 12/2001 | Moyer | ................ | G06F 9/30116 712/34 |
| 6,434,689 B2 * | 8/2002 | Fleck | ................... | G06F 9/3897 712/34 |
| 6,883,085 B2 * | 4/2005 | Deveruex | ............ | G06F 9/3877 712/34 |
| 7,590,823 B1 * | 9/2009 | Ansari | ................ | G06F 9/30145 712/200 |
| 7,865,698 B1 * | 1/2011 | Purcell | ................ | G06F 9/30145 712/208 |
| 8,145,882 B1 * | 3/2012 | Kishore | .................. | G06F 15/16 712/34 |
| 2004/0257370 A1 * | 12/2004 | Lippincott | ............ | G06F 9/5011 345/502 |
| 2005/0108497 A1 * | 5/2005 | Bridges | ................. | G06F 9/3851 711/207 |
| 2005/0278504 A1 * | 12/2005 | Huang | .................. | G06F 9/3877 712/34 |
| 2007/0186210 A1 * | 8/2007 | Hussain | ............. | G06F 9/30167 717/106 |
| 2010/0115240 A1 * | 5/2010 | Falik | .................... | G06F 9/3855 712/210 |
| 2012/0066483 A1 * | 3/2012 | Boury | .................. | G06F 9/3855 712/233 |
| 2013/0185542 A1 * | 7/2013 | Mejdrich | .............. | G06F 9/3881 712/214 |
| 2014/0229708 A1 * | 8/2014 | Muff | ..................... | G06F 9/3836 712/36 |

OTHER PUBLICATIONS

Whitfield (Arm Custom Instructions for a World of a Trillion Devices); Oct. 8, 2019; accessed at https://www.arm.com/blogs/blueprint/arm-custom-instructions on Oct. 7, 2020; 8 pages (Year: 2019).*

International Search Report and Written Opinion of the International Searching Authority for PCT/GB2020/050788 dated Jun. 29, 2020, 12 pages.

* cited by examiner

SHARING INSTRUCTION ENCODING SPACE BETWEEN A COPROCESSOR AND AUXILIARY EXECUTION CIRCUITRY

TECHNICAL FIELD

The present disclosure relates to data processing. In particular, the present disclosure relates to the sharing of an instruction encoding space used by a data processing apparatus.

DESCRIPTION

An instruction set can be defined for a data processing apparatus within a given instruction encoding space, such that each individual value within that instruction encoding space may represent a different data processing operation which the data processing apparatus can be instructed to carry out. Thus, the values within the instruction encoding space represent not only the type of instruction (often by means of a selected 'opcode'), but also specify operands, flags, source/destination registers, and so on. However, not all possible values within an instruction encoding space may be defined to cause the data processing apparatus itself to carry out data processing operations. For example a subset of the instruction encoding space can be used to provide instructions for a separate 'supporting' data processing apparatus, such as a 'coprocessor' which lies outside the data processing apparatus, but for which the apparatus can be provided with an interface via which such delegated data processing can be instructed. This may for example be useful when providing a specialised coprocessor, which is particularly fast at carrying out certain types of data processing operations.

SUMMARY

In one example embodiment described herein there is an apparatus comprising: fetch circuitry to retrieve a sequence of instructions; execution circuitry to perform first data processing operations; an auxiliary execution circuitry interface; a coprocessor interface to provide a connection to a coprocessor outside the apparatus; and decoding circuitry to generate control signals in dependence on the instructions of the sequence of instructions, wherein the decoding circuitry is responsive to instructions in a first subset of an instruction encoding space to generate the control signals to control the execution circuitry to perform the first data processing operations, wherein the decoding circuitry is responsive to instructions in a second subset of the instruction encoding space to generate the control signals in dependence on a configuration condition: to generate the control signals for the auxiliary execution circuitry interface when the configuration condition has a first state; and to generate the control signals for the coprocessor interface when the configuration condition has a second state.

In another example embodiment described herein there is a method of data processing comprising: retrieving a sequence of instructions; and generating control signals in dependence on the instructions of the sequence of instructions, wherein in response to instructions in a first subset of an instruction encoding space the control signals are generated to control execution circuitry to perform data processing operations, and wherein in response to instructions in a second subset of the instruction encoding space the control signals are generated in dependence on a configuration condition to: control an auxiliary execution circuitry interface when the configuration condition has a first state; and control a coprocessor interface when the configuration condition has a second state.

In a further example embodiment described herein there is a non-transitory computer-readable medium configured to store computer-readable code for fabrication of a processing device comprising: fetch circuitry to retrieve a sequence of instructions; register circuitry to hold data values in a set of registers; execution circuitry to perform first data processing operations with respect to the data values in the set of registers; an auxiliary execution circuitry interface; a coprocessor interface to provide a connection to a coprocessor outside the processing device; and decoding circuitry to generate control signals in dependence on the instructions of the sequence of instructions, wherein the decoding circuitry is responsive to instructions in a first subset of an instruction encoding space to generate the control signals to control the execution circuitry to perform the first data processing operations, wherein the decoding circuitry is responsive to instructions in a second subset of the instruction encoding space to generate the control signals in dependence on a configuration condition: to generate the control signals for the auxiliary execution circuitry interface to control auxiliary execution circuitry accessed via the auxiliary execution circuitry interface to perform second data processing operations with respect to the data values in the set of registers when the configuration condition has a first state; and to generate the control signals for the coprocessor interface when the configuration condition has a second state.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1A:
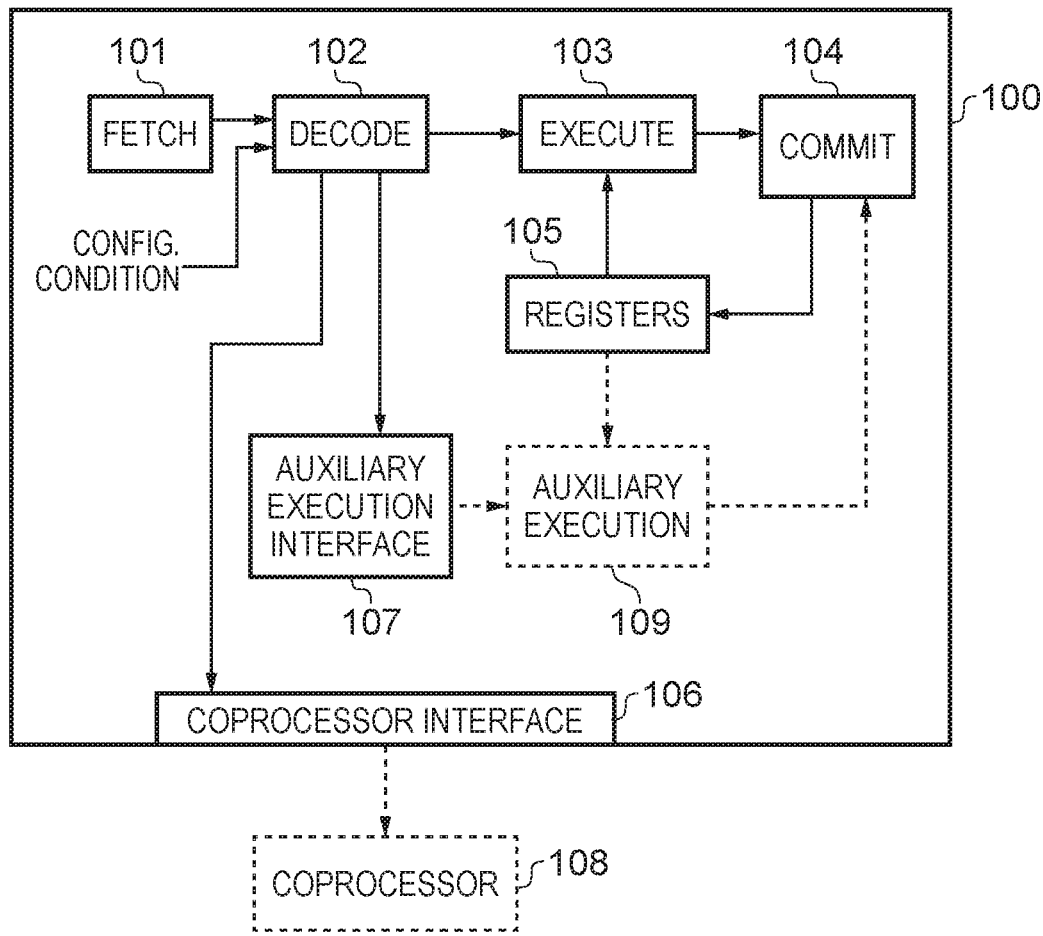
FIG. 1A schematically illustrates an apparatus in some example embodiments in which the control signals generated by the decode stage are directed to either an auxiliary execution circuitry interface or to a coprocessor interface in dependence on a configuration condition.

Before discussing the embodiments with reference to the accompanying figures, the following description of embodiments is provided.

In accordance with one example configuration there is provided an apparatus comprising: fetch circuitry to retrieve a sequence of instructions; execution circuitry to perform first data processing operations; an auxiliary execution circuitry interface; a coprocessor interface to provide a connection to a coprocessor outside the apparatus; and decoding circuitry to generate control signals in dependence on the instructions of the sequence of instructions, wherein the decoding circuitry is responsive to instructions in a first subset of an instruction encoding space to generate the control signals to control the execution circuitry to perform the first data processing operations, wherein the decoding circuitry is responsive to instructions in a second subset of the instruction encoding space to generate the control signals in dependence on a configuration condition: to generate the control signals for the auxiliary execution circuitry interface when the configuration condition has a first state; and to generate the control signals for the coprocessor interface when the configuration condition has a second state.

Whilst generally the definitions of instructions within an instruction encoding space necessarily need to be well defined and invariant, the present techniques are based on the realisation that a more flexible configuration of a data processing apparatus can be provided when a subset of the instruction encoding space is shared, in particular, when it is shared between being used to define instructions for a coprocessor accessed via a coprocessor interface of the apparatus and instructions for auxiliary execution circuitry accessed via an auxiliary execution circuitry interface of the apparatus. The choice between which of these two interfaces should be the target of the control signals generated by the decoding circuitry when an instruction within this shared subset of the instruction encoding space is decoded is then usefully made dependent on a configuration condition. Accordingly in the active apparatus (and indeed from instruction to instruction) the target of these instructions in the shared subset of the instruction encoding space is not fixed, but is controllable by means of, or at least responsive to, this configuration condition. The configuration condition may take a variety of forms, for example being dependent on a value held within the apparatus or a signal received from outside the apparatus, and this steering value may in some instances may be set by hardware and in other instances may be set by software. Where the configuration condition may vary as time passes (even, as mentioned above, from one instruction to the next) it may under such circumstances be described as a dynamic configuration condition. A particular feature of the flexibility which the provision of an apparatus of this configuration brings is that, where the apparatus comprises an auxiliary execution circuitry interface, this enables the provider of the apparatus to leave the definition of the auxiliary execution circuitry itself to a customer who wishes to produce a final active apparatus based on the original specification of the apparatus provided. For example, it will be understood in the context of the multi-stage process by which a contemporary data processing apparatus is typically manufactured, that at an initial stage it may be the case that only a register transfer level (RTL) definition of the data processing apparatus is provided. Then via a sequence of processing stages (such as synthesis, place and route, layout, and fabrication) the RTL definition is turned into the final chip-based device on silicon. In this context the present techniques enable the provider of the original RTL to leave the configuration of the auxiliary execution circuitry itself to a third party, whilst nevertheless providing a comprehensive RTL definition of the remainder of the apparatus in which that auxiliary execution circuitry will be found. As such, that third party can re-use a portion of the instruction encoding space which is otherwise used to control a coprocessor interface of the apparatus to implement their own set of instructions for the auxiliary execution circuitry they choose to add to the apparatus, and where that auxiliary execution circuitry can be supported by existing mechanisms of the 'main' data processing apparatus.

In the finally produced data processing apparatus (e.g. on silicon) the auxiliary execution circuitry may also be provided, although it is important to note that it need not be since by suitable provision of the configuration condition the decode stage can be controlled to only interpret the shared portion of the instruction encoding space for the coprocessor interface. Nevertheless in some embodiments the apparatus further comprises register circuitry to hold data values in a set of registers, wherein the execution circuitry is arranged to perform the first data processing operations with respect to the data values in the set of registers; and auxiliary execution circuitry, wherein the decoding circuitry is responsive to the instructions in the second subset of the instruction encoding space when the configuration condition has the first state to generate the control signals to control the auxiliary execution circuitry via the auxiliary execution circuitry interface to perform second data processing operations with respect to the data values in the set of registers. Thus, where the auxiliary execution circuitry has access to the same set of registers used by the (main) execution circuitry, this allows a tight integration of the operation of the two sets of circuitry and a coordination of the data processing performed by each. The auxiliary execution circuitry may take a wide variety of forms. It could be responsive to just one instruction or to many different instructions in the shared portion of the instruction encoding space. There may be just one instance of the auxiliary execution circuitry or there might be more than one distinct parts, for example where each part of the latter is arranged to perform different data processing. Where the apparatus comprises distinct types of registers, e.g. general purpose registers and floating-point registers, the auxiliary execution circuitry may comprise corresponding distinct parts, for example one part arranged to access the general purpose registers and one part floating-point registers. The decoding circuitry can provide control signals for each part.

It should generally be noted that in any embodiment of the present techniques the control signals may be provided to both the coprocessor interface and the auxiliary execution circuitry interface, however only one of these interfaces (in dependence on the configuration condition) will be sent an indication that the control signals are active (i.e. that the instruction is to be performed). Thus to one of ordinary skill in the art it will be understood that directing control signals to one interface may mean providing controls signals to the interface along with an active indication, and that not directing controls signals to an interface may mean providing controls signals to the interface along with an inactive indication.

The decoding circuitry may generate the control signals for the auxiliary execution circuitry interface in a variety of ways, but in some embodiments the decoding circuitry is responsive to an instruction of the second subset of the instruction encoding space, when the configuration condition has the first state, to generate the control signals comprising a value indicative of a portion of the instruction. Thus the decoding circuitry can indicate to the auxiliary execution circuitry interface the content of a portion of the instruction. This could involve the decoding circuitry passing that portion "verbatim" to the auxiliary execution circuitry interface or it could involve a different signal being passed to the auxiliary execution circuitry interface, which indicates what the portion was. The signals transmitted to the auxiliary execution circuitry interface may themselves be modified in form (e.g. inverted at least once) as part of the transmission process, but the semantic meaning of the portion indicated may remain invariant. As such the decoding circuitry of the apparatus may therefore not "decode" this portion of the instruction, instead leaving this process to be carried out within the auxiliary execution circuitry itself. On the one hand this reduces the complexity of the decoding circuitry and on the other hand provides further flexibility to the manner in which the auxiliary execution circuitry is implemented. In some embodiments the decoding circuitry is responsive to an instruction of the second subset of the instruction encoding space to generate the control signals comprising a value indicative of a portion of the instruction. As such, the control signals passed to either the auxiliary execution circuitry interface or the coprocessor interface may indicate the content of a portion of the instruction as described above, whether that involves the portion being passed "verbatim" or in a modified form (e.g. inverted at least once) as part of the transmission process, but the semantic meaning of the portion indicated may remain invariant. Indeed the control signals may in fact be passed to both the auxiliary execution circuitry interface and the coprocessor interface, regardless of the configuration condition, but where the state of the configuration condition determines which of the auxiliary execution circuitry interface and the coprocessor interface reacts to the control signals received.

The configuration condition may take a wide variety of forms, but in some embodiments the configuration condition has the first state or the second state in dependence on at least one data value held in a register of the set of registers. Accordingly, software executing on the apparatus itself can define the configuration condition and therefore which of the auxiliary execution circuitry interface and the coprocessor interface is controlled when an instruction within the shared instruction encoding space is encountered.

In some embodiments the apparatus further comprises a configuration value storage, wherein the configuration condition has the first state or the second state in dependence on a configuration value held in the configuration value storage. Accordingly, dedicated storage may be provided in the apparatus to hold a value which determines whether the configuration condition has the first state or the second state.

The configuration value storage may be structured in a variety of ways to hold the configuration value, but in some embodiments the configuration value held in the configuration storage is software-programmable. For example the configuration value storage may be provided as a memory-mapped CPU register.

The configuration condition may be arranged to be interpreted as having the first state or the second state in dependence on a hardware condition within the apparatus and in some embodiments the configuration condition has the first state or the second state in dependence on an input signal to the apparatus. Accordingly, for example a pin on the periphery of a chip may be used by an external agent to determine whether the configuration condition has the first state or the second state. When the apparatus forms part of a system-on-chip, another component of the system-on-chip (e.g. another instance of the same apparatus, another processing device, etc.) can thus determine whether the configuration condition has the first state or the second state.

Where the apparatus has a coprocessor interface to provide a connection to a coprocessor outside the apparatus, the configuration condition may be arranged to be dependent on information received from that coprocessor and in some embodiments the apparatus is responsive to a signal indicative that the coprocessor outside the apparatus is at least one of: currently busy performing data processing caused by previous control signals for the coprocessor interface; currently busy performing data processing caused by other control signals received from another apparatus; and/or currently not fully powered, to cause the configuration condition to have the first state. Accordingly therefore when the coprocessor is currently not available to perform data processing then this can be used as a trigger to determine that instead the decoding circuitry should control the auxiliary execution circuitry interface in response to instructions within the shared subset of the instruction encoding space.

In some embodiments the apparatus is part of a system-on-chip and the apparatus is responsive to a signal indicative that the coprocessor outside the apparatus is currently busy performing data processing caused by further control signals for the coprocessor interface provided by a further processor which is part of the system-on-chip to cause the configuration condition to have the first state. This further processor could be another instance of the same apparatus or could be a different type of processing device.

In some embodiments the second subset of the instruction encoding space is sub-divided into a plurality of sub-sections when the configuration condition has the first state, wherein for each sub-section there is an invariant instruction profile. Hence within such a sub-section the invariant instruction profile means that this sub-section of the instruction will always have the same meaning thus reducing the complexity of the decoding circuitry provided as part of the present techniques.

For example, in some embodiments the invariant instruction profile comprises at least one of: a type associated with at least one input register; a type associated with at least one output register; a number of input registers; a number of input flags; a number of result registers; and a number of output flags. Thus, one or more of these features can be defined to be the same across all instructions.

In some embodiments the invariant instruction profile comprises at least one of: a position in the instruction of at least one input register specifier; a position in the instruction of at least one input flags indicator; a position in the instruction of at least one result register specifier; and a position in the instruction of at least one output flags indicator. Accordingly, this facilitates the provision of the decoding circuitry since one or more of these positions within the instruction can be consistently interpreted to have a particular meaning.

The apparatus has a coprocessor interface providing a connection to a coprocessors, and in some embodiments there may be more than one coprocessor accessible. Accordingly in such embodiments the coprocessor interface provides connections to a plurality of coprocessors outside the apparatus, and wherein the decoding circuitry is responsive to the instructions in the second subset of the instruction encoding space to generate the control signals: to control a first coprocessor of the plurality of coprocessors when the configuration condition has the second state; and to control a second coprocessor of the plurality of coprocessors when the configuration condition has a third state. The configuration condition can thus further be used to select between multiple coprocessors accessible via the coprocessor interface.

In some embodiments in which access to multiple coprocessors is supported the auxiliary execution circuitry interface itself may be used as a coprocessor interface. Accordingly therefore the configuration condition can be used only as a selection between coprocessors.

In some such embodiments, when the coprocessor interface provides connections to a plurality of coprocessors outside the apparatus, the second subset of the instruction encoding space is sub-divided into a plurality of sub-regions, wherein the decoding circuitry is responsive to the instructions in the second subset of the instruction encoding space when the configuration condition has the second state to generate the control signals to control a selected coprocessor of the plurality of coprocessors, and wherein selection of the selected coprocessor is dependent on a sub-region of the plurality of sub-regions and on a sub-region-to-coprocessor mapping stored in the apparatus. Thus, the provision of the sub-region-to-coprocessor mapping enables a further layer of configurability to be introduced, such that the selected coprocessor to be controlled by control signals generated by the decoding circuitry depends on the mapping.

The sub-region-to-coprocessor mapping may be variously stored in the apparatus, but in some embodiments the sub-region-to-coprocessor mapping is stored in a configuration register of a configuration store. Modification of the mappings may be restricted to certain privilege levels and thus in some embodiments access to the configuration register of the configuration store is restricted to software executing at least at a defined minimum privilege level. In some embodiments an attempt to access the configuration register from a privilege level lower than the defined minimum privilege level may cause an exception to be raised. In some embodiments an attempt to execute an instruction from a sub-region for which there is no sub-region-to-coprocessor mapping defined in the configuration register may cause an exception to be raised.

In some embodiments the apparatus further comprises a mapping storage, wherein the sub-region-to-coprocessor mapping stored is stored in the mapping storage, wherein the mapping storage has a capacity to store less than a full set of sub-region-to-coprocessor mappings, and the apparatus is responsive to absence of a currently required sub-region-to-coprocessor mapping in the mapping storage: to cause the currently required sub-region-to-coprocessor mapping to be retrieved from memory to the mapping storage; and/or to raise an exception. If the mapping storage is full when the currently required sub-region-to-coprocessor mapping is retrieved from memory, this may cause another sub-region-to-coprocessor mapping currently stored in the mapping storage to be evicted. Accordingly, this mapping storage may for example be configured in a translation lookaside buffer (TLB) like manner according to which mappings are stored in memory and retrieved as required into the mapping storage, where a particular mapping in the mapping storage may for a period be frequently used, but when a new mapping storage is required and if it is not present, then the required mapping be retrieved from memory. Alternatively, or in addition, an exception may be raised when the current mapping is not present in the mapping storage and, depending on the implementation, an exception handling routine can be provided to respond appropriately.

The sub-region-to-coprocessor mappings may be variously configured and in some embodiments the sub-region-to-coprocessor mapping is process-dependent and/or thread-dependent. Thus, depending on the particular data processing activity of the apparatus, a different subset of the available coprocessors may be used.

In accordance with one example configuration there is provided a method of data processing comprising: retrieving a sequence of instructions; and generating control signals in dependence on the instructions of the sequence of instructions, wherein in response to instructions in a first subset of an instruction encoding space the control signals are generated to control execution circuitry to perform data processing operations, wherein in response to instructions in a second subset of the instruction encoding space the control signals are generated in dependence on a configuration condition to: control an auxiliary execution circuitry interface when the configuration condition has a first state; and control a coprocessor interface when the configuration condition has a second state.

In accordance with one example configuration there is provided a non-transitory computer-readable medium configured to store computer-readable code for fabrication of a processing device comprising: fetch circuitry to retrieve a sequence of instructions; register circuitry to hold data values in a set of registers; execution circuitry to perform first data processing operations with respect to the data values in the set of registers; an auxiliary execution circuitry interface; a coprocessor interface to provide a connection to a coprocessor outside the processing device; and decoding circuitry to generate control signals in dependence on the instructions of the sequence of instructions, wherein the decoding circuitry is responsive to instructions in a first subset of an instruction encoding space to generate the control signals to control the execution circuitry to perform the first data processing operations, wherein the decoding circuitry is responsive to instructions in a second subset of the instruction encoding space to generate the control signals in dependence on a configuration condition: to generate the control signals for the auxiliary execution circuitry interface to control auxiliary execution circuitry accessed via the auxiliary execution circuitry interface to perform second data processing operations with respect to the data values in the set of registers when the configuration condition has a first state; and to generate the control signals for the coprocessor interface when the configuration condition has a second state.

In the context of the provision of a non-transitory computer-readable medium on which is stored computer-readable code defining a logical configuration of a processing device, where this may for example be provided in the form of RTL code, the present techniques further provide that the dependency in the decoding circuitry as to whether to generate control signals on the basis of the second subset of the instruction encoding space for the auxiliary executing circuitry interface or for the coprocessor interface may be dependent on a configuration condition which is not defined to have a particular value when the non-transitory computer readable medium on which the computer readable (e.g. RTL) code is produced (and sold, distributed, etc.). However during the fabrication process via which the computer-readable code (e.g. RTL code) is used, this configuration condition is set such that the finally generated (e.g. embodied as a silicon chip) circuitry has a static configuration whereby the decoding circuitry is then responsive to the second subset of the instruction encoding space always to generate the control signals for one of the auxiliary execution circuitry interface and the coprocessor interface.

Accordingly the non-transitory computer-readable medium has computer-readable code stored thereon defining a logical configuration of a processing device. This computer-readable code may for example be provided in the form of RTL code. Regardless of its particular format the computer-readable code provides an input to the chain of processes by which the finally generated circuitry embodying the processing device is manufactured.

Accordingly, in some embodiments the decoding circuitry is arranged to be configured in dependence on the configuration condition during a synthesis process for the fabrication of the processing device. Thus, the computer-readable code specifies a dependency in a logical configuration of the decoding circuitry which is coded to be resolved during a synthesis process for the fabrication of the processing device by reception during the synthesis process of an indication of whether the configuration condition has the first state or the second state. This configuration condition may for example form an input to a synthesis tool which takes RTL code as an input and itself generates a logic gate level description of the required circuitry by a logic synthesis tool, where the synthesis results are then used by placement and routing tools to create a physical layout. The configuration condition may however form an input to any stage in the fabrication process where the final arrangement of the fabricated circuitry can still be affected to the extent that the decoding circuitry then has this static configuration to interpret the second subset of the instruction encoding space for one of the auxiliary execution circuitry interface and the coprocessor interface.

Particular embodiments will now be described with reference to the figures.

FIG. 1A illustrates a data processing apparatus 100 in accordance with one embodiment. The apparatus 100 comprises fetch circuitry 101, decode circuitry 102, execution circuitry 103, commit (writeback) circuitry 104, and registers 105, which together form a data processing pipeline in a manner with which one of ordinary skill in the art will be familiar and for the sake of clarity the illustration of FIG. 1A is necessarily only at a highly simplified schematic level. Nevertheless it will be understood that the fetch circuitry 101 is arranged to retrieve instructions from a memory hierarchy (not shown) and to pass these to the decoding circuitry 102. Instructions for the data processing apparatus 100 are defined within an instruction encoding space. One portion of this instruction encoding space (possibly the majority portion) is defined to provide a space for the definition of instructions to control the data processing operations carried out by the execution circuitry 103. Thus, when an instruction within this portion of the instruction encoding space is encountered by the decode circuitry 102, it generates control signals which cause the execution circuitry 103 to carry out corresponding data processing operations, according to which data values may be retrieved from memory into the registers 105, data processing operations may be carried with a respect to values held in the registers 105, and once completed the commit stage 104 may cause certain values to be written back to the registers 105, and certain values from the registers may be written out to the memory. In addition, the decode circuitry 102 is arranged to be responsive to another portion of the instruction encoding space such that when an instruction within this portion of the instruction encoding space is encountered by the decode circuitry 102 it generates control signals which are either applied to a coprocessor interface 106 or to an auxiliary execution interface 107, depending on a currently prevailing configuration condition which forms a further input to the decode circuitry 102. Coprocessor circuitry 108 is also shown on the illustration of FIG. 1A, however, where this does not form part of the apparatus 100, the path thereto and the coprocessor 108 itself are illustrated with dashed lines. Similarly, auxiliary execution circuitry 109 is also shown within the apparatus 100 in FIG. 1A, but this is also shown in the figure with a dashed line, since it is envisaged that the auxiliary execution circuitry 109 may be provided by a different party to the party which provides the apparatus 100. For example the configuration of the components illustrated by solid lines in FIG. 1A of the apparatus 100 may represent a CPU design provided by a CPU designer, but where the design of the auxiliary execution circuitry 109 is left open to another chip designer who then has the flexibility to design the auxiliary execution circuitry in a manner particularly suited to an envisaged end purpose for a chip fabricated in accordance with the schematic of FIG. 1A. In particular, note that the auxiliary execution circuitry 109 may also have access to the standard CPU registers 105 of the apparatus 100 allowing for tight integration of the auxiliary execution circuitry 109 with the remainder of such a CPU. Thus, where a chip designer knows that the intended usage of the chip to be produced will frequently carry out specific data processing tasks these data processing tasks may be handled in a variety of ways according to the present techniques. An accelerator which is provided with a configuration which is specifically intended to carry out particular data processing tasks more efficiently may generally take one of three types according to the present techniques. A first type is a memory-mapped accelerator, such as a graphics processing unit (GPU), directly connected to the memory bus (not illustrated in FIG. 1A). A second type of accelerator is the coprocessor 108 shown in FIG. 1A for which a dedicated coprocessor interface 106 is provided as part of the apparatus 100. This enables the coprocessor 108 to be closely coupled and moreover to be directly under the control of the apparatus 100 by means of those instructions in the instruction stream within the shared instruction encoding space (and when the configuration condition is such that that shared instruction encoding space is interpreted by the decode circuitry to apply to the coprocessor interface 106 and control signals are generated accordingly. The present techniques in particular provide a third type of accelerator in the form of the auxiliary execution circuitry 109 which is even more tightly coupled to the data path of the apparatus 100, most notably because of the possibility for the auxiliary execution circuitry to have access to the main registers 105 of the apparatus 100. Accordingly the auxiliary execution circuitry 109 can be tightly coupled with the main CPU, have access to standard registers, and can have its instructions interleaves with instructions for the main CPU in the stream of instructions.

Hence the present techniques enable e.g. chip designers to add application domain specific features in a small embedded processor (the "auxiliary execution circuitry", accessed via the auxiliary execution circuitry interface), within the context of the larger apparatus (e.g. a main CPU). For example, where the apparatus may be a CPU designed by Arm Ltd of Cambridge, UK, this maintains the ecosystem advantages of an Arm-compliant processor, but enables further differentiation by the chip designer who can implement a customized, market-specific accelerator with an Arm architecturally compliant CPU as a container.

Figure 1B:
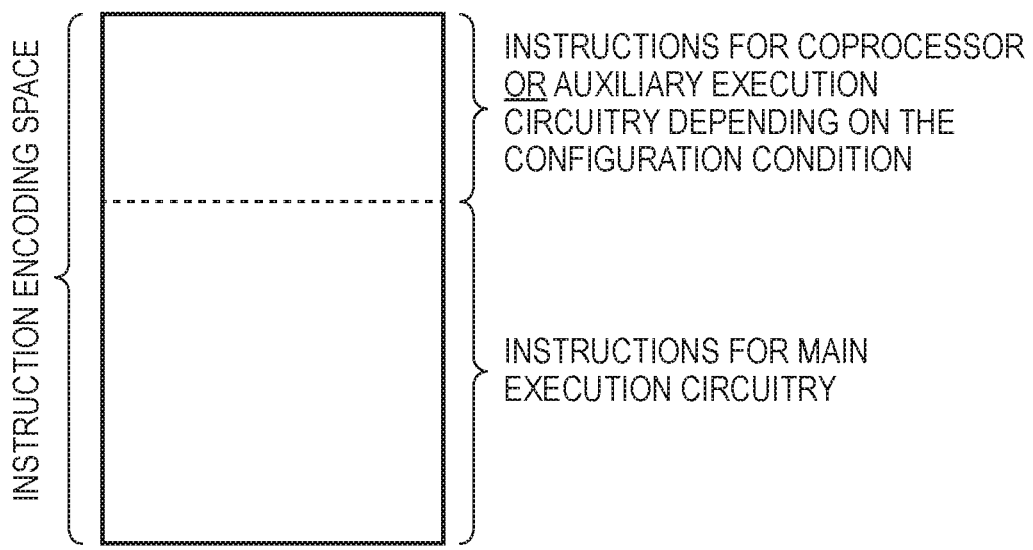
FIG. 1B schematically illustrates an instruction encoding space wherein part of the encoding space is used for instructions for main execution circuitry and part of the encoding space is shared between instructions for a coprocessor and instructions for auxiliary execution circuitry depending on a configuration condition in some embodiments.

FIG. 1B schematically illustrates the instruction encoding space and its subdivision into two portions, the lower portion in FIG. 1B corresponding to instructions for main execution circuitry (e.g. the execution circuitry 103 in the example of FIG. 1A) and a second portion which is shared between being used to control a coprocessor and to control an auxiliary execution circuitry via an auxiliary execution circuitry interface. Accordingly, instructions in the shared upper part of the instruction encoding space shown in FIG. 1B are decoded to provide control signals either for the auxiliary execution circuitry interface or the coprocessor interface depending on the currently prevailing configuration condition. It is not necessary for all of the "coprocessor portion" of the encoding space to be reused for auxiliary execution circuitry control. For any regions that are not used, the decoding circuitry decodes the instruction either for the co-processor interface, if present and enabled, or as a NOCP ("no coprocessor") exception, if not present or not accessible.

Figure 1C:
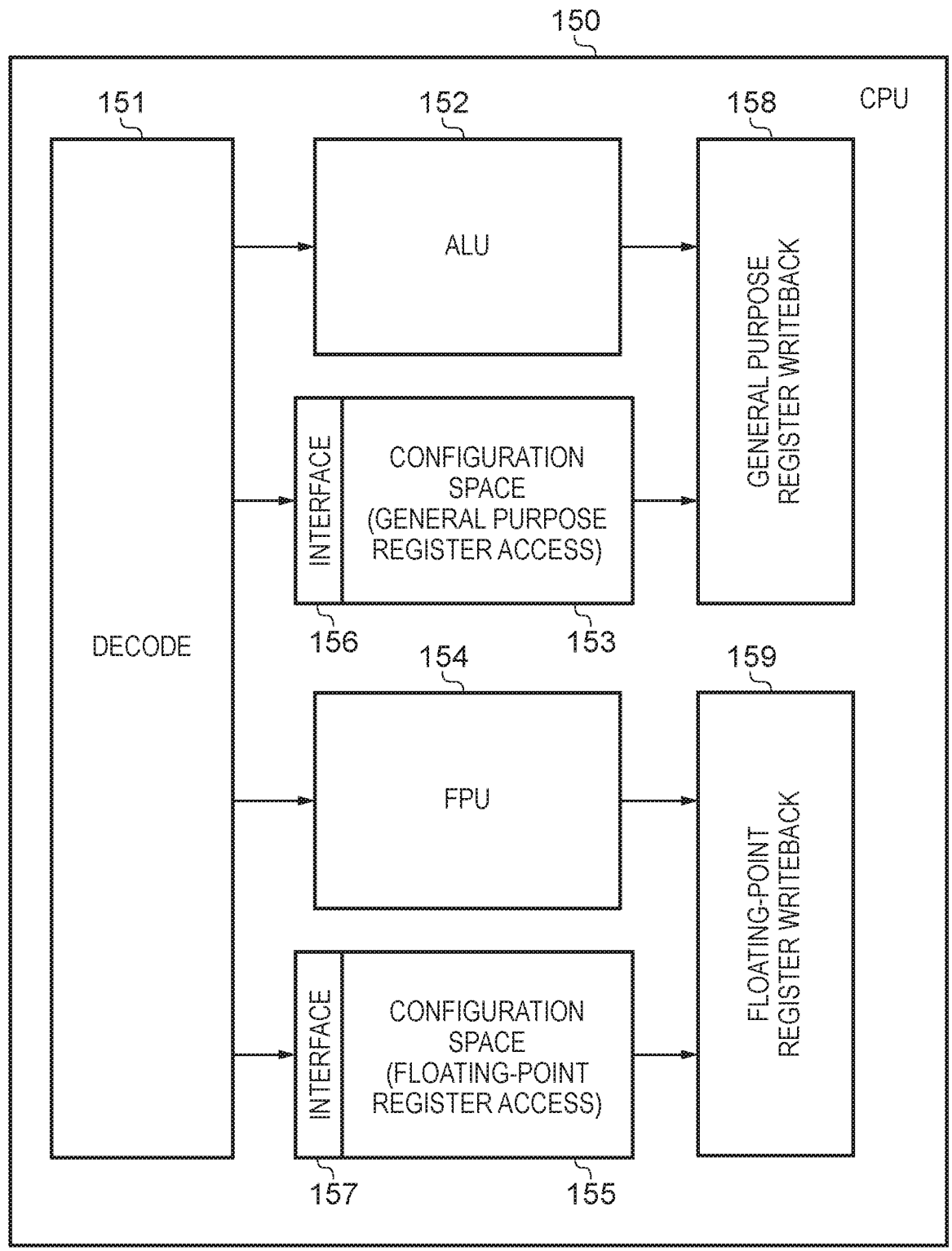
FIG. 1C schematically illustrates an apparatus in some example embodiments in which the auxiliary execution circuitry comprises two distinct parts, one which has access to general purpose registers of the apparatus and one which has access to floating-point registers of the apparatus.

FIG. 1C schematically illustrates a data processing apparatus 150 in some embodiments. Here only the decode, execute, and writeback stages are explicitly illustrated. The decode circuitry 151 generates control signals on the basis of the instructions it receives and these control signals are passed to the execute stage. The execute stage in FIG. 1C comprises two main datapaths: an ALU (arithmetic logic unit) 152 and an FPU (floating-point unit) 154. The present techniques can provide configuration spaces associated with each of the main datapaths, as shown by the configuration space 153, which has access to the general purpose registers used by the ALU 152, and the configuration space 155, which has access to the floating-point registers used by the FPU 154. Where the circuitry to be provided within the configuration space 153 and the configuration space 155 is yet to be defined, the apparatus 150 is shown to comprises the interfaces 156 and 157 (auxiliary execution circuitry interfaces). Finally two writeback stages 158 and 159 are shown, which act with respect to the general purpose registers and the floating-point registers respectively. Hence each configuration space provided inside the processor is driven by the pre-decoded instructions (i.e. control signals) from the coprocessor-shared portion of the instruction set. Whilst each configuration space can be freely configured to perform specific data processing operations, the tight integration with the main processor means that the CPU manages all required control signals, instruction interlocking, data dependencies, and hazard handling. Instructions are either single-cycle or multi-cycle and can be pipelined.

Figure 2A:
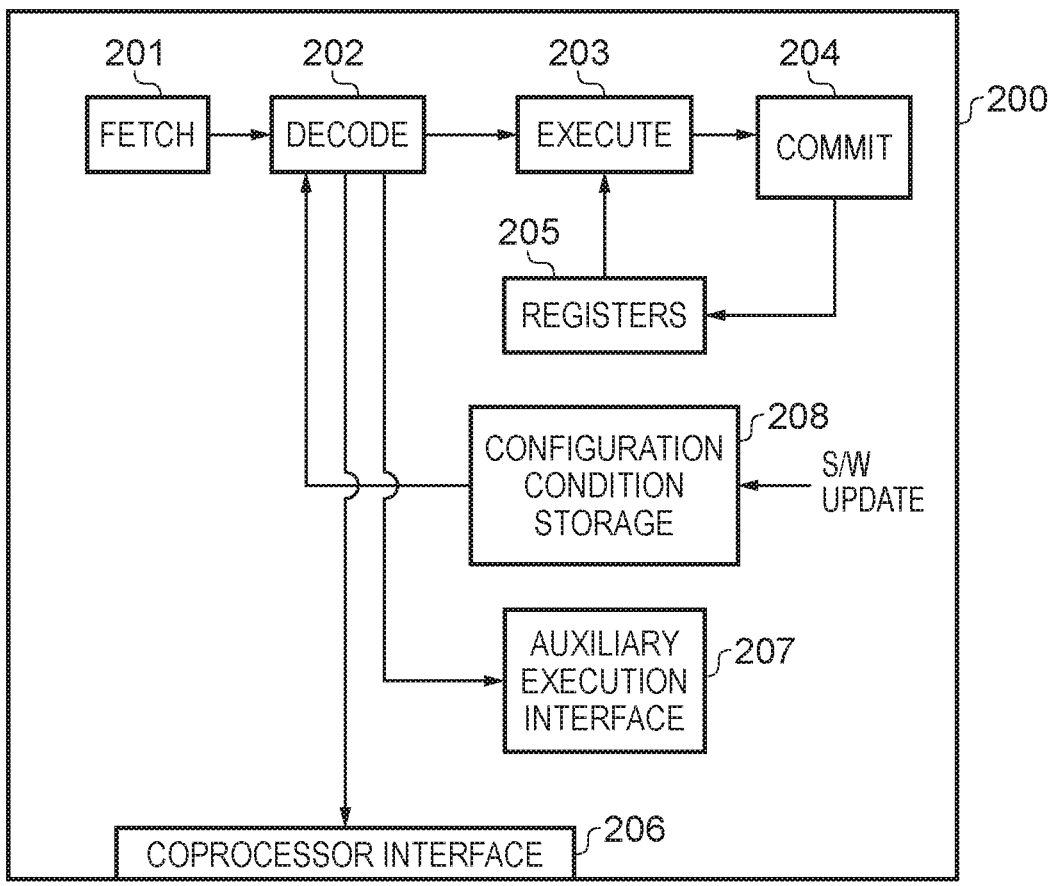
FIG. 2A schematically illustrates a data processing apparatus in some embodiments in which a configuration condition is derived from a value stored in configuration condition storage.

FIG. 2A schematically illustrates a data processing apparatus 200 in some embodiments. As in the example of FIG. 1A, an instruction execution pipeline is shown, here represented by the fetch circuitry 201, the decode circuitry 202, the execution circuitry 203, the commit circuitry 204, and the registers 205. Instructions decoded by the decode circuitry 202 cause control signals to be generated. These control signals can cause the execution circuitry 203 to perform data processing operations when the instructions belong to a first portion of the instruction encoding space. Instructions belonging to a second portion of the instruction encoding space (see for example FIG. 1B) will either cause the control signals to be directed to the coprocessor interface 206 or to the auxiliary execution interface 207. In the example illustrated in FIG. 2 the apparatus further comprises configuration condition storage 208, which holds a value which is determinative of the configuration condition. On the basis of this value the decode circuitry 202 directs the control signals to either the coprocessor interface 206 or the auxiliary interface 207. Whilst the configuration condition storage 208 is illustrated in the example of FIG. 2A as separate from the registers 205, in some embodiments this storage may be a further register within the set of registers 205. Whether or not it belongs to that set of registers, the configuration condition storage is accessible by software and accordingly upon execution of suitable instructions by the main execution circuitry a particular value can be stored in the configuration condition storage 208 and thus to control the behaviour of the decode circuitry 202. For example the configuration value storage 208 may be provided as a memory-mapped CPU register.

Figure 2B:
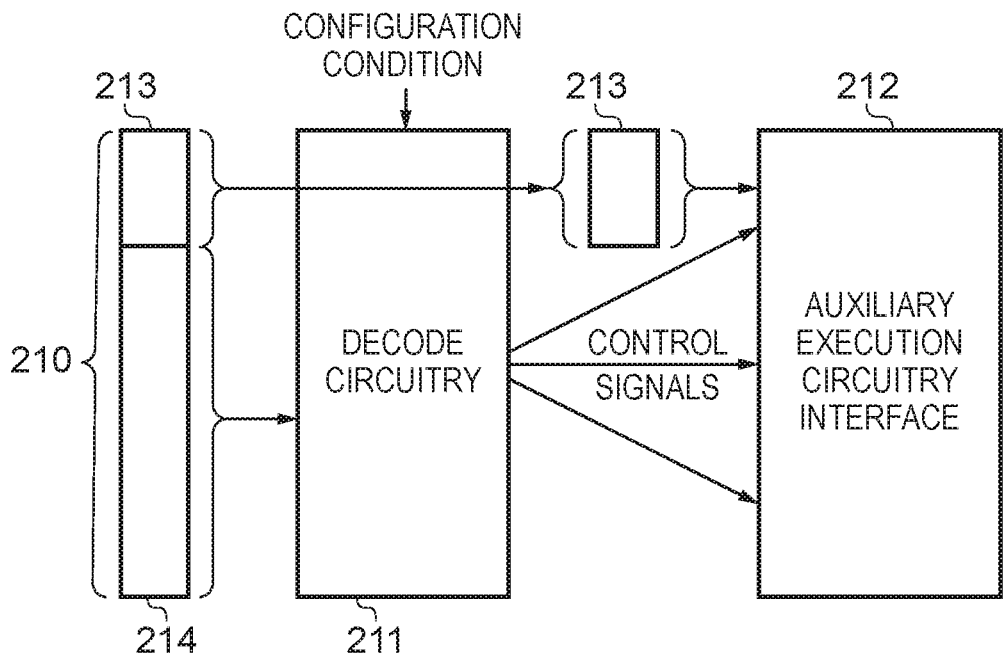
FIG. 2B schematically illustrates the generation of control signals for an auxiliary execution circuitry interface in some embodiments.

FIG. 2B schematically illustrates the generation of control signals for an auxiliary execution circuitry interface in some embodiments. An instruction 210, belonging to the second subset of the instruction encoding space (i.e. that subset shared with the coprocessor interface) is received by the decode circuitry 211. The configuration condition is currently such that the control signals generated by the decode circuitry 211 are directed to the auxiliary execution interface 212. The instruction 210 is shown to comprise two portions, 213 and 214, and whilst the part 214 causes various different control signals to be generated by the decode circuitry 211 which are then received by the auxiliary execution interface 212, the part 213 is passed "unamended" to the auxiliary execution interface 212. One of ordinary skill in the art will understand that "unamended" here means that the semantic meaning of the part is unchanged, but the specific bit pattern transmitted from the decode circuitry 211 to the auxiliary execution interface 212 may for example undergo one or more bit inversions, as are usual for transmissions on the internal communication paths of a data processing apparatus. As mentioned, the semantic meaning is unchanged, and therefore interpretation of this part 213 of the instruction can be left to the auxiliary execution circuitry. In other embodiments the portions 213 and 214 of the instruction 210 may not be contiguous, and instead the bits of the instruction encoding corresponding to portions 213 and 214 may be wholly or partially interleaved.

Figure 3:
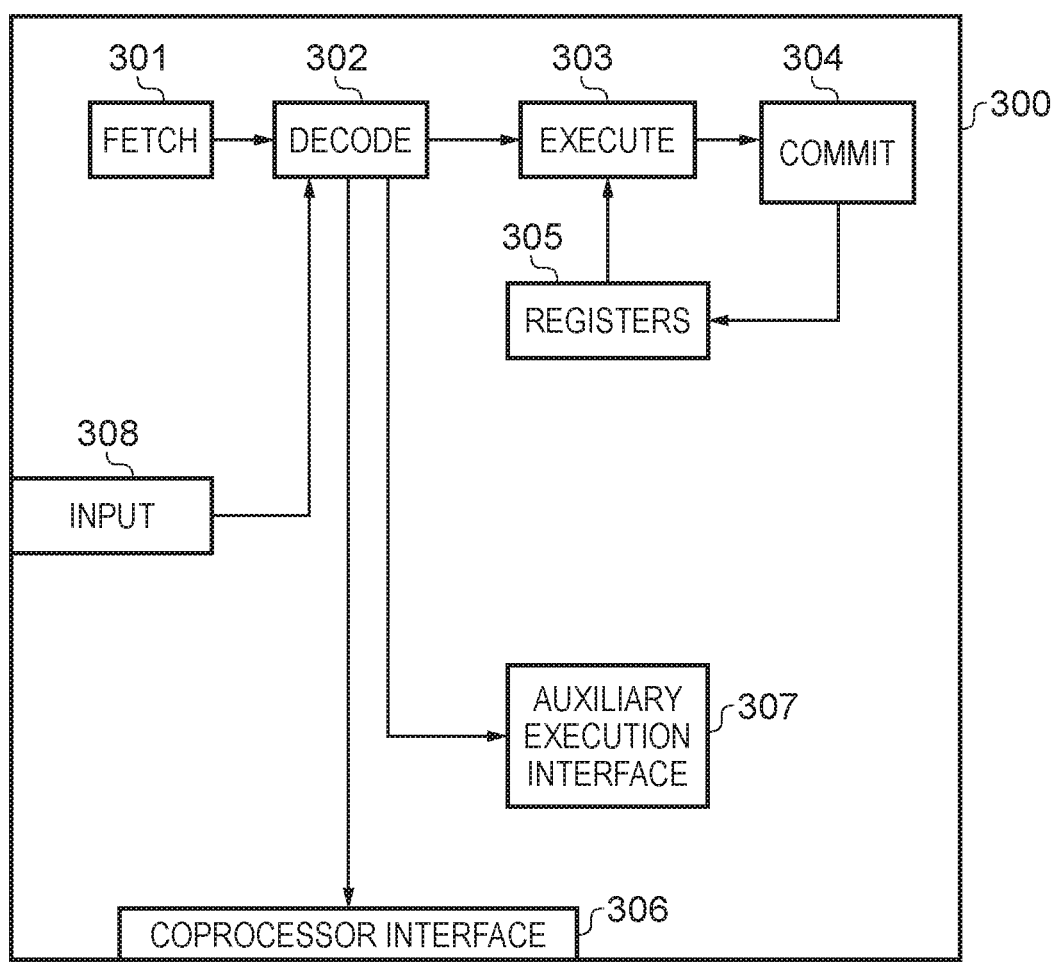
FIG. 3 schematically illustrates the data processing apparatus in some embodiments in which a configuration condition is dependent on an input received at the periphery of the data processing apparatus.

FIG. 3 schematically illustrates a data processing apparatus 300 in some embodiments, where an execution pipeline comprises fetch circuitry 301, decode circuitry 302, execution circuitry 303, commit circuitry 304, and registers 305. The decoding operations performed by the decode circuitry 302 are influenced by the state of an input 308 at the periphery of the data processing apparatus. For example where the data processing apparatus 300 is embodied as part of a system-on-chip, input 308 may be an input signal originating in another component of that system-on-chip. Accordingly, depending on a logical state of the input 308 caused by an external agent, the decoding performed by the decode circuitry 302 for instructions within a shared portion of the instruction encoding space can be caused to be directed either to the coprocessor interface 306 or the auxiliary execution interface 307.

Figure 4:
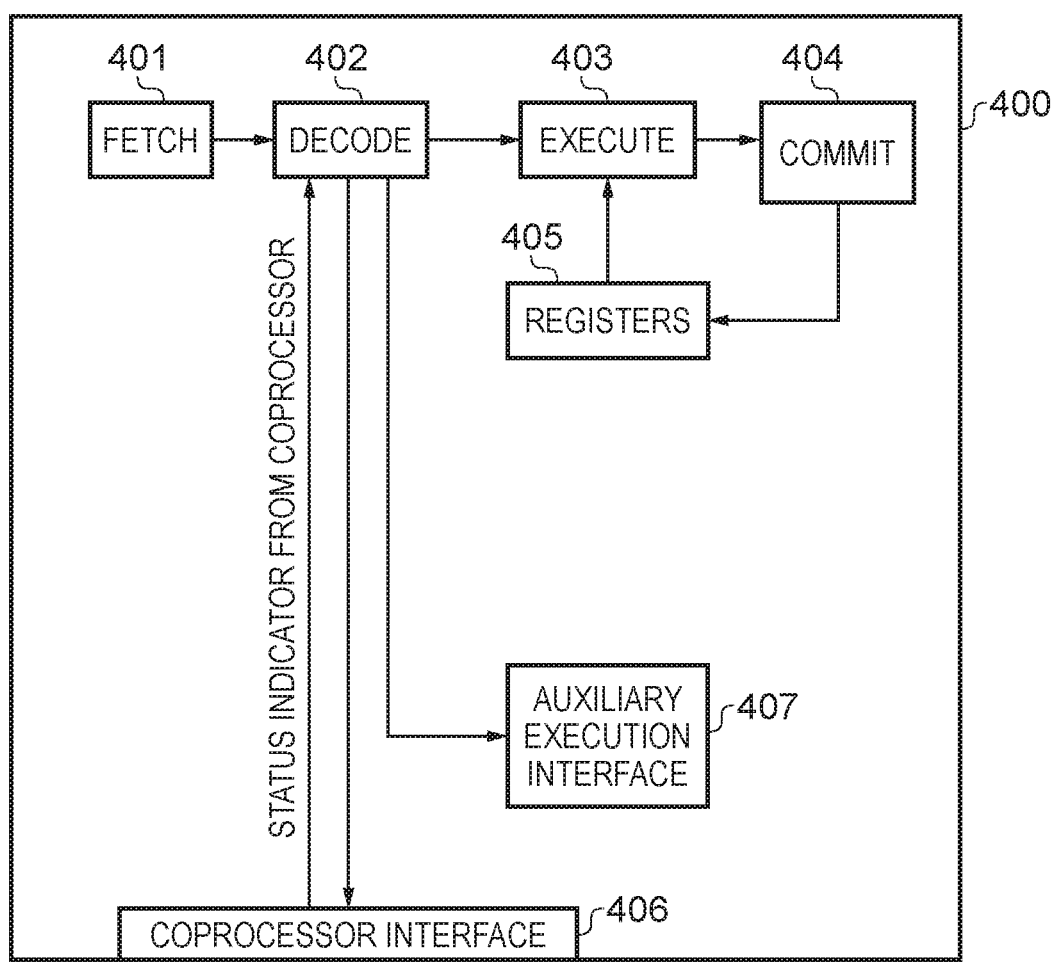
FIG. 4 schematically illustrates a data processing apparatus in some example embodiments in which a configuration condition is dependent on a status indication received from a coprocessor.

FIG. 4 schematically illustrates a further example data processing apparatus 400 according to some embodiments where the execution pipeline comprises fetch circuitry 401, decode circuitry 402, execution circuitry 403, commit circuitry 404, and registers 405. The instructions within a shared portion of the instruction encoding space either control the coprocessor interface 406 or the auxiliary execution interface 407, this being dependent on a status indicator which is received by the decode circuitry 402 from the coprocessor interface 406, which is indicative of a current status of the coprocessor to which the coprocessor interface 406 provides access. For example, the signal can indicate that the coprocessor is active, but currently busy, in which case processing may be directed to the auxiliary execution interface 407. Alternatively the status indicator may for example indicate that the coprocessor is currently not fully powered and in this situation the control signals may also instead be directed to the auxiliary execution interface 407.

Figure 5A:
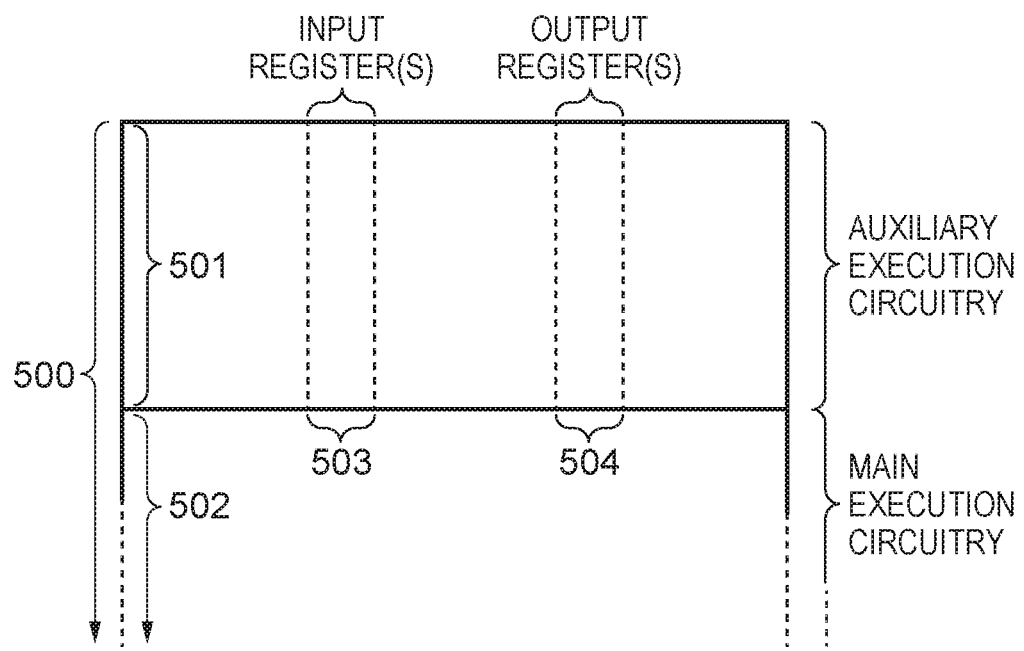
FIGS. 5A and 5B schematically illustrate a shared portion of an instruction encoding space, wherein for instructions defined for auxiliary execution circuitry the instructions have an at least partially invariant instruction profile in some example embodiments.
Figure 5B:
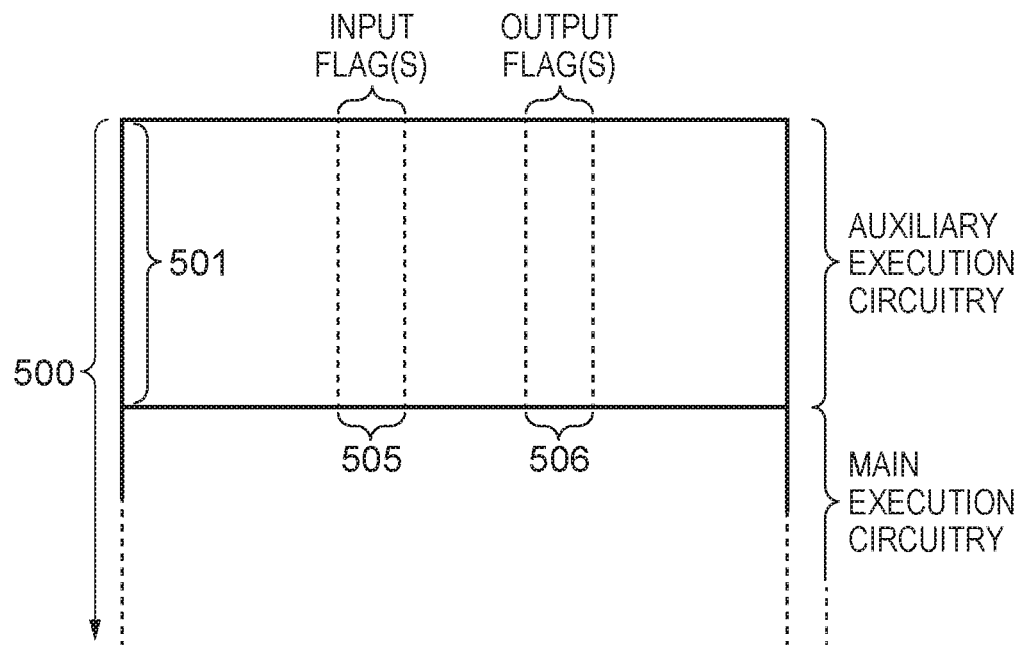

FIG. 5A is a representation of an instruction encoding space 500 used to define instructions to be received by an apparatus according to the present techniques, wherein the full instruction encoding space 500 comprises a subset 501 which is shared between the auxiliary execution circuitry interface and the coprocessor interface and a subset 502 which is used for instructions directed at the main execution circuitry. In the illustration of FIG. 5A a configuration condition is assumed to currently prevail, such that instructions in the subset 501 of the instruction encoding space will generate control signals for the auxiliary execution circuitry. FIG. 5A further illustrates that, within the shared subset 501 of the instruction encoding space, instructions have an at least partially invariant instruction profile, according to which two sub-sections of any instruction within this subset 501 use a first sub-section of the instruction 503 to define one or more input registers for the instruction and a second sub-section of the instruction 504 to define one or more output registers for the instruction. Thus, although the remainder of the configuration of the instructions within the shared subset 501 may be freely defined, the invariant nature of the two sub-sections 503 and 504 facilitates the decoding of these instructions, i.e. reduces the potential complexity of the decoding circuitry. FIG. 5B shows an example in which the same instruction encoding space 500 further comprises, within the shared subset 501, an invariance such that the further sub-sections 505 and 506 of the instructions defined for the auxiliary execution circuitry interface are reserved for indicators of input flags and output flags 505 and 506 respectively.

In one example embodiment, the instructions which may be defined for the auxiliary execution circuitry interface are grouped into two sets of three classes of instruction. Grouping the instructions in this manner facilitates the provision of the supporting decoding circuitry. With reference to the example of FIG. 1C, three classes of instruction are defined for this example Arm-compliant embodiment to operate on the general-purpose register file (including the condition code flags APSR_nzcv). Three further classes operate on the floating-point register file only. The three classes are defined by the following instruction patterns:

<operation code><destination register>

<operation code><destination register><source register>

<operation code><destination register><source register 1><source register 2>

In this example embodiment the destination register of an instruction may be read, as well as written (non-accumulator and accumulator variants). The operation code can be split between a true operation code in the custom (auxiliary) datapath and an immediate value used in the custom datapath. Some immediate consequences of these features are that no operations on the floating-point registers can set condition codes and there are no operations using registers from both register files.

Figure 5C:
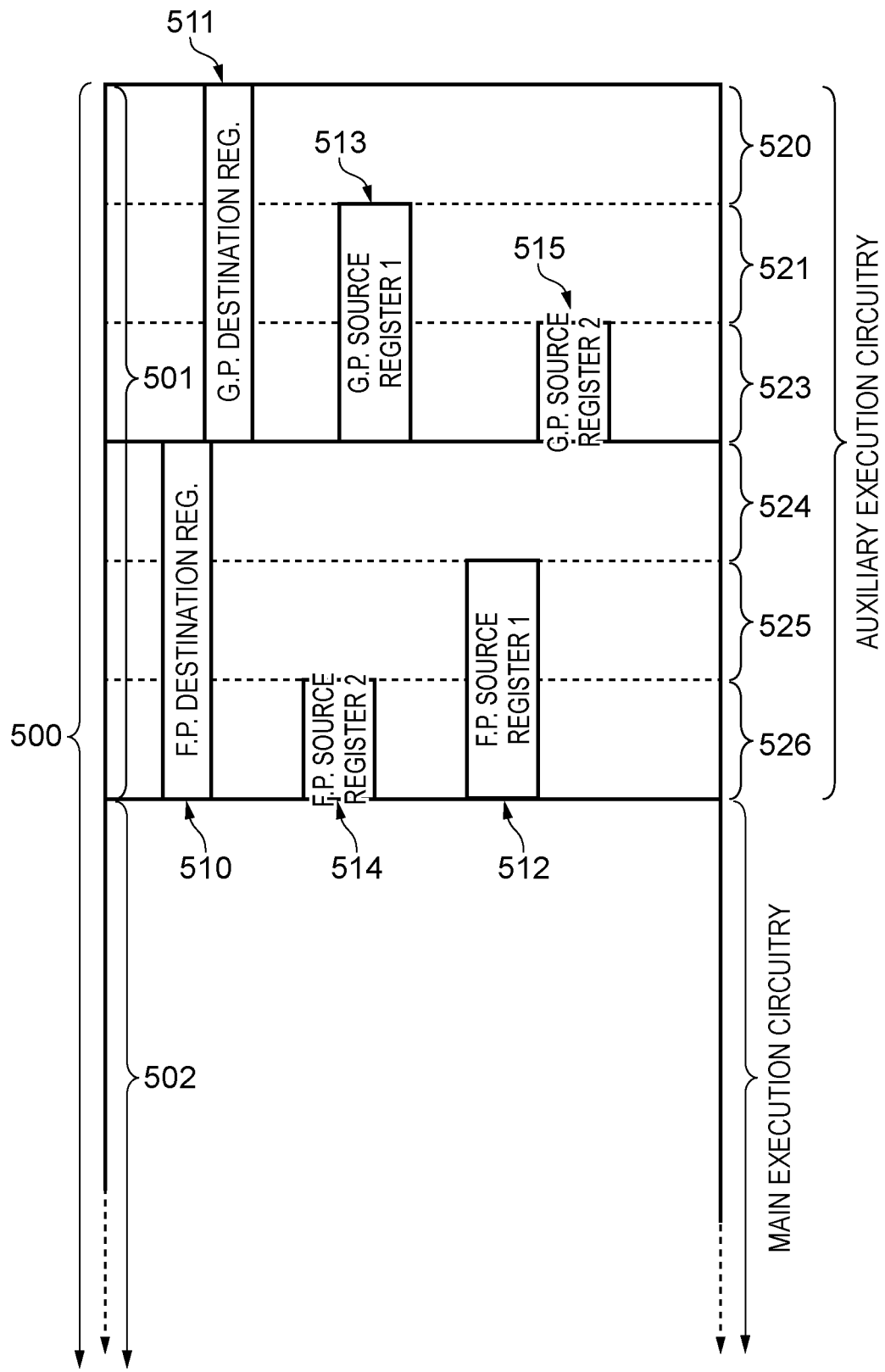
FIG. 5C schematically illustrates a shared portion of an instruction encoding space, wherein for instructions defined for auxiliary execution circuitry the instructions are defined in groups which have an at least partially invariant instruction profile in some example embodiments.

FIG. 5C provides an illustration of how the two sets of three classes may be mapped onto the shared subset of the encoding space 501. The first set of three classes, representing instructions that access the general-purpose register file, are mapped onto the sub-sections of the encoding space 520, 521, and 523. Here, instructions in the class that only have a destination register 511 are in sub-section 520, instructions in the class that have a destination register 511 and a source register 513 are in sub-section 521, and instructions in the class that have a destination register 511, a first source register 513, and a second source register 515 are in sub-section 523. Similarly, the three further classes that operate on floating-point registers are mapped on to sub-sections 524, 525, and 526 of the encoding space. In this part, instructions in the class that only have a destination register 510 are in sub-section 524, instructions in the class that have a destination register 510 and a source register 512 are in portion 525, and instructions in the class that have a destination register 510, a first source register 512, and a second source register 514 are in sub-section 526. Between different sub-sections of the encoding space 501 the size and position of the register arguments may differ, however within a given sub-section the size and position is invariant.

The present techniques are not constrained to any particular register size, however in the example embodiment described above with respect to FIG. 3 operations on the general-purpose register file operate on 32-bit registers, or a dual-register consisting of a 64-bit value constructed from an even-numbered general-purpose register and its immediately following odd pair.

| General-purpose registers and NZCV flags | |
| --- | --- |
| Instruction | Assembly |
| CX1{A} | CX1{A}<br>Pn,{Rd,}Rd,#imm |
| CX2{A} | CX2{A}<br>Pn,{Rd,}Rd,Rn,#imm |
| CX3{A} | CX3{A}<br>Pn,{Rd,}Rd,Rn,Rm,#imm |

| FPU and MVE registers | |
| --- | --- |
| Instruction | Assembly |
| VCX1{A}.F | VCX1{A}<br>Pn,{Sd,}Sd,#imm |
| VCX2{A}.F | VCX2{A}<br>Pn,{Sd,}Sd,Sn,#imm |
| VCX3{A}.F | VCX3{A}<br>Pn,{Sd,}Sd,Sn,Sm,#imm |
| VCX1{A}.D | VCX1{A}<br>Pn,{Dd,}Dd,#imm |
| VCX2{A}.D | VCX2{A}<br>Pn,{Dd,}Dd,Dn,#imm |
| VCX3{A}.D | VCX3{A}<br>Pn,{Dd,}Dd,Dn,Dm,#imm |
| VCX1{A}.Q | VCX1{A}<br>Pn,{Qd,}Qd,#imm |
| VCX2{A}.Q | VCX2{A}<br>Pn,{Qd,}Qd,Qn,#imm |
| VCX3{A}.Q | VCX3{A}<br>Pn,{Qd,}Qd,Qn,Qm,#imm |

For each class, the imm field is different and the number of instructions available in each class is different.

The benefit of providing bespoke circuitry as the auxiliary execution circuitry can be illustrated by considering a population count function:

```
uint32_t__popcount(unsigned int x) {
    int n = 0;
    for (int i = 0; i < 32; ++i) {
        n += (x >> i) & 1;
    }
    return n;
}
```

A standard hand-optimized implementation for an Arm-compliant architecture would look like this:

```
mov.w    r1, #0x55555555
and.w    r1, r1, r0, lsr #1
subs     r0, r0, r1
mov.w    r1, #0x33333333
and.w    r1, r1, r0, lsr #2
bic      r0, r0, #0xCCCCCCCC
add      r0, r1
mov.w    r1, #0x01010101
add.w    r0, r0, r0, lsr #4
bic      r0, r0, #0xF0F0F0F0
muls     r0, r1, r0
lsrs     r0, r0, #24
```

This could be replaced with a single bespoke instruction to be executed in bespoke auxiliary circuitry which can be implemented in one cycle:

CX1A r0, r0, #0//pop count in r0, return r0

Such an instruction could be used either directly in a specialized library or be inferred as an intrinsic instruction within C code. All standard compilers can support such intrinsic bespoke instructions.

Figure 6A:
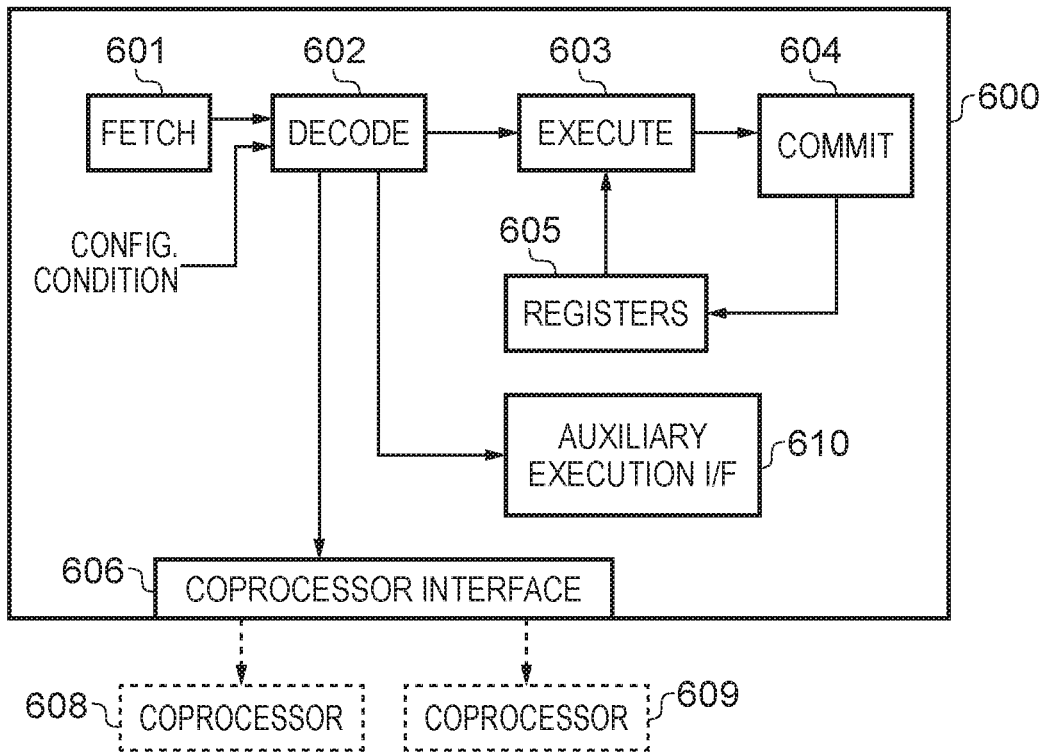
FIG. 6A schematically illustrates a data processing apparatus in some embodiments in which the coprocessor interface provides connections to multiple coprocessors.

FIG. 6A schematically illustrates a data processing apparatus 600 in some example embodiments. The instruction execution pipeline is here schematically represented by the fetch circuitry 601, the decode circuitry 602, the execute circuitry 603, the commit circuitry 604, and the registers 605. In this example embodiment the apparatus comprises "multiple" coprocessor interface 606, which provides access to the multiple coprocessors 608 and 609 (which do not themselves form part of the apparatus 600). The apparatus 600 further comprises auxiliary execution interface 610. In this example embodiment the decode circuitry 602 is responsive to more than two possible states of the configuration condition, such that when an instruction within the shared portion of the instruction encoding space is encountered by the decode circuitry 602 it will generate control signals for either the coprocessor interface 606 (for coprocessor 608), or for the coprocessor interface 606 (for coprocessor 609), or for the auxiliary execution interface 610 in dependence on which of three possible states that the configuration condition can take is currently prevalent.

Figure 6B:
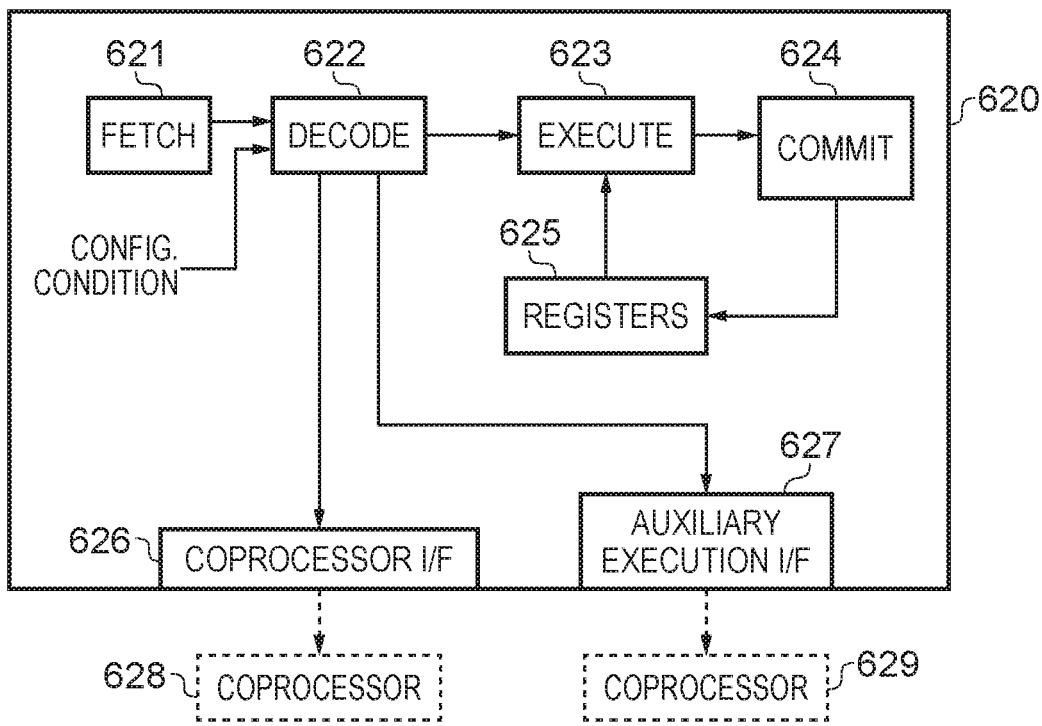
FIG. 6B schematically illustrates a data processing apparatus in some example embodiments in which an auxiliary execution circuitry interface provides a coprocessor interface.

FIG. 6B schematically illustrates a data processing apparatus 620 in some example embodiments. Here the execution pipeline is represented by fetch circuitry 621, decode circuitry 622, execute circuitry 623, commit circuitry 624, and registers 625. In this example the auxiliary execution interface 627 is configured to perform the role of a coprocessor interface such that control signals generated by the decode circuitry 622 directed to the auxiliary execution interface 627 cause data processing operations to be carried out by the coprocessor 629 connected thereto. The apparatus also comprises a coprocessor interface 626 providing access to coprocessor 628. Accordingly in dependence on the configuration condition an instruction of the shared portion of instruction encoding space causes either the coprocessor 628 to be controlled via the coprocessor interface 626 or the coprocessor 629 to be controlled via the auxiliary execution interface 627.

Figure 7:
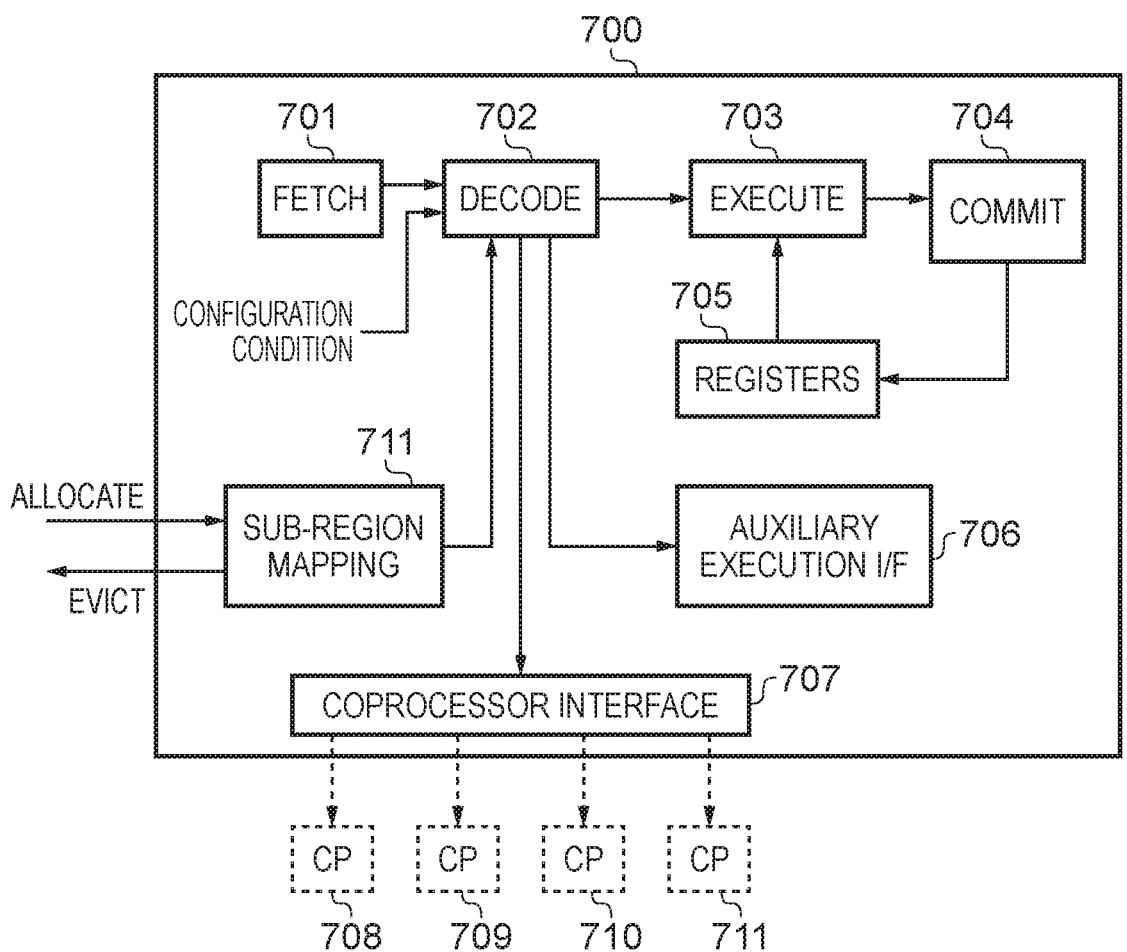
FIG. 7 schematically illustrates a data processing apparatus in some example embodiments in which a shared region of an instruction encoding space is used for multiple coprocessors and the coprocessor to which instructions in the shared region of the instruction encoding space map is dependent on a stored sub-region mapping within the data processing apparatus.

FIG. 7 schematically illustrates a data processing apparatus 700 in some example embodiments. Here the instruction execution pipeline is represented by fetch circuitry 701, decode circuitry 702, execute circuitry 703, commit circuitry 704, and registers 705. An auxiliary execution interface 706 is provided to which the decode circuitry 702 can direct control signals. The apparatus further comprises a coprocessor interface 707, via which a connection is made to four coprocessors 708, 709, 710, and 711. The decoding of instructions within the shared portion of the instruction encoding space is dependent on a sub-region mapping stored in the sub-region mapping storage 711. The mapping used can also be dependent on the current process and/or thread ID. Hence for different mappings, instructions within the shared portion of the instruction encoding space can be decoded to cause different coprocessors to be used. The sub-region mapping storage 711 is configured to operate in the manner of a TLB or micro-TLB (translation lookaside buffer), wherein one or more mappings are stored and when the mapping required (e.g. for change of process ID) is not present, a fault is generated and the mapping required is loaded from memory. A mapping currently in the storage may be evicted (or at least victimized) when the new mapping is loaded (allocated). There may also be global entries that provide a mapping that applies to all processes. To keep the hardware simple, the update to the mapping storage can be done by software. In another embodiment, if there is only a limited amount of information required for the mapping information it may be stored in a current program status register (CPSR), thus being updated on a context switch when the process/thread changes. Access to a configuration register storing the mapping information may be restricted to software executing at least at a defined minimum privilege level. Thus in the illustrated example an attempt to access the configuration register from a privilege level lower than the defined minimum privilege level causes an exception to be raised. Similarly in this example an attempt to execute an instruction from a sub-region for which there is no sub-region-to-coprocessor mapping defined in the configuration register causes an exception to be raised.

Figure 8:
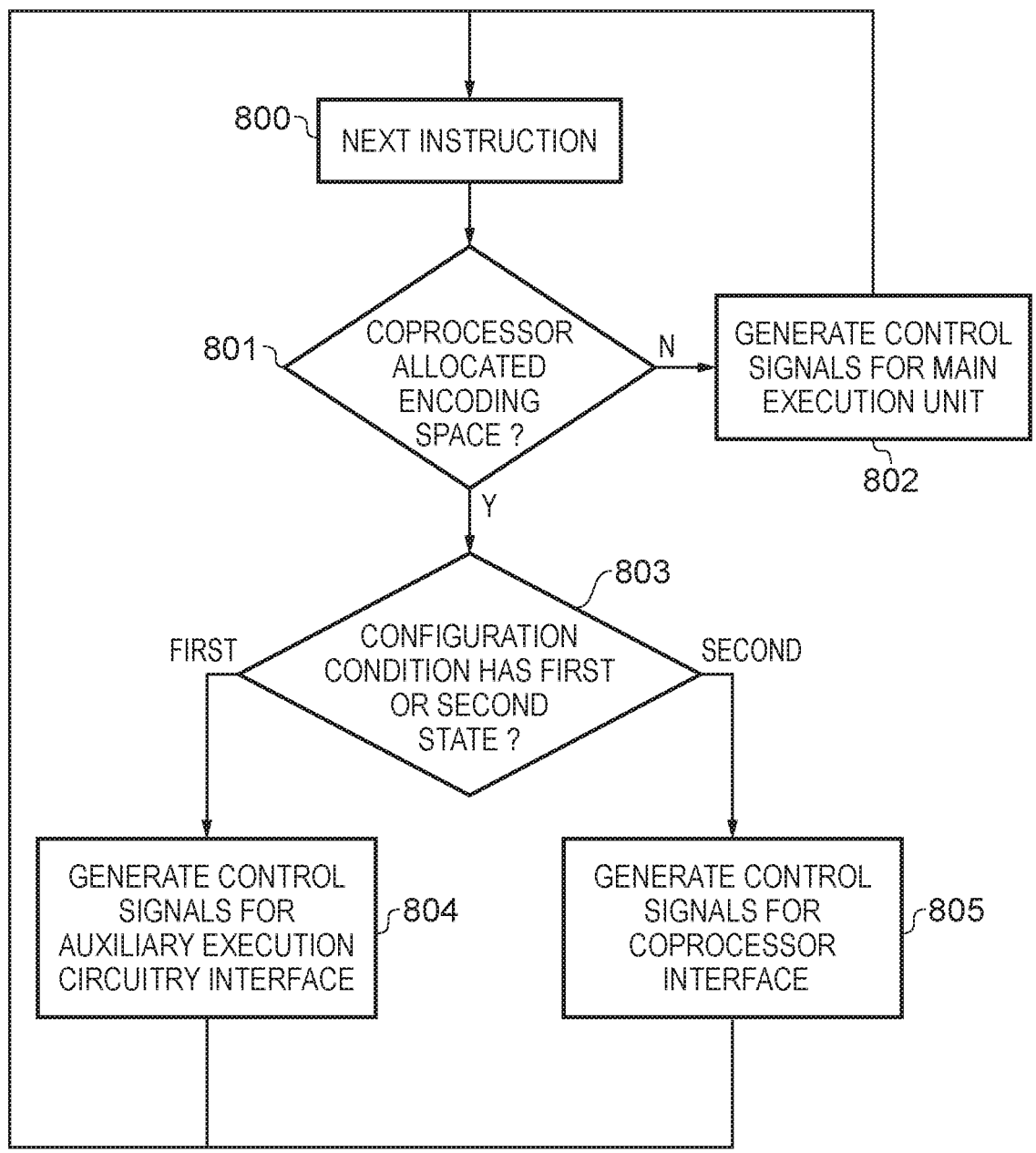
FIG. 8 is a flow diagram showing a sequence of steps which are taken according to the method of some embodiments in which the target of control signals generated by decoding an instruction within a shared portion of an instruction encoding space is dependent on a configuration condition.

FIG. 8 is a flow diagram showing a sequence of steps which are taken according to the method of some embodiments. Specifically, a sequence of steps is shown which are taken by decoding circuitry to process a sequence of received instructions. The flow can be considered to begin at step 800 where the next instruction is received. At step 801 it is determined if the encoding of this instruction falls within the portion of the instruction encoding space allocated to the coprocessor (the "shared" portion). If it does not, then the flow proceeds to step 802 where, since this instruction relates to the main execution unit of the data processing apparatus, the control signals are generated to control that main execution unit appropriately in order to carry out the data processing operations defined by the instruction. The flow then returns to step 800. However, for instructions within the coprocessor allocated encoding space the flow proceeds to step 803, where it is determined if the configuration condition currently has a first or a second state. When it has the first state the flow proceeds to step 804, where the decoding circuitry generates control signals for the auxiliary execution circuitry interface, whereas when it has the second state the decoding circuitry generates control signals for the coprocessor interface at step 805. The flow then returns to step 800.

Figure 9:
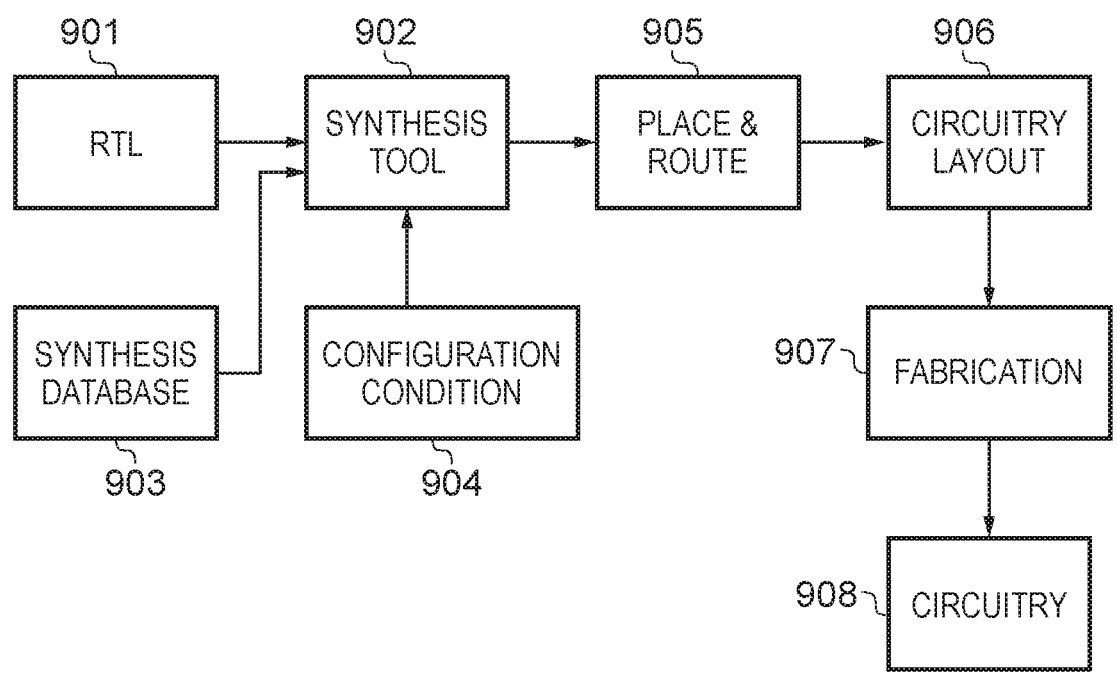
FIG. 9 schematically illustrates a synthesis chain according to which RTL provides the original input and fabricated circuitry is the final output and in which a configuration condition determines the manner in which a synthesis tool processes the RTL code, determining whether a shared region of an instruction encoding space for a data processing apparatus generated as a result of the synthesis chain shown generates control signals for an auxiliary execution circuitry interface or for a coprocessor interface.

FIG. 9 schematically illustrates a sequence of processes which are used in association with some example embodiments. The overall process illustrated is one by which a conceptual design of a data processing apparatus is turned into a physical item of circuitry, e.g. embodied as a silicon-based chip. The process flow begins with the provision of a logical configuration of a processing device, where this may for example be provided in the form of RTL (register-transfer level) code 901 stored in a computer-readable form on a computer-readable medium. This RTL code 901 forms one input to a synthesis tool 902. The synthesis tool then generates a netlist (a description of the connections of the required circuitry), for which the synthesis also has access to a synthesis database 903, providing standard definitions of components etc. In addition, according to the present techniques, a configuration condition 904 also provides a further input to the synthesis process. The further input may be provided at the same point as the RTL code 901, or at an intermediate stage of synthesis process. In some embodiments the configuration condition 904 is in the form of further RTL code. This configuration condition in particular controls the manner in which the decoding circuitry is configured, namely whether control signals which are generated on the basis of the second subset of the instruction encoding space are directed to the auxiliary executing circuitry interface or for the coprocessor interface. Accordingly this is not fixed in the RTL code 901, but once it has been specified by the configuration condition 904, the finally generated circuitry has a static configuration whereby the decoding circuitry is then responsive to the second subset of the instruction encoding space always to generate the control signals for one of the auxiliary execution circuitry interface and the coprocessor interface. The configuration condition may in other embodiments form an input to a different intermediate stage of the fabrication process, as long as the final arrangement of the fabricated circuitry can still be affected to the extent that the decoding circuitry then has this static configuration to interpret the second subset of the instruction encoding space for one of the auxiliary execution circuitry interface and the coprocessor interface. In the illustrated process flow, the netlist generated by the synthesis tool 902 is used by placement and routing tools 905 to create a physical layout 906. This circuitry layout 906 is then provided to a fabrication facility 907, which physically manufactures the final circuitry 908.

Figure 10:
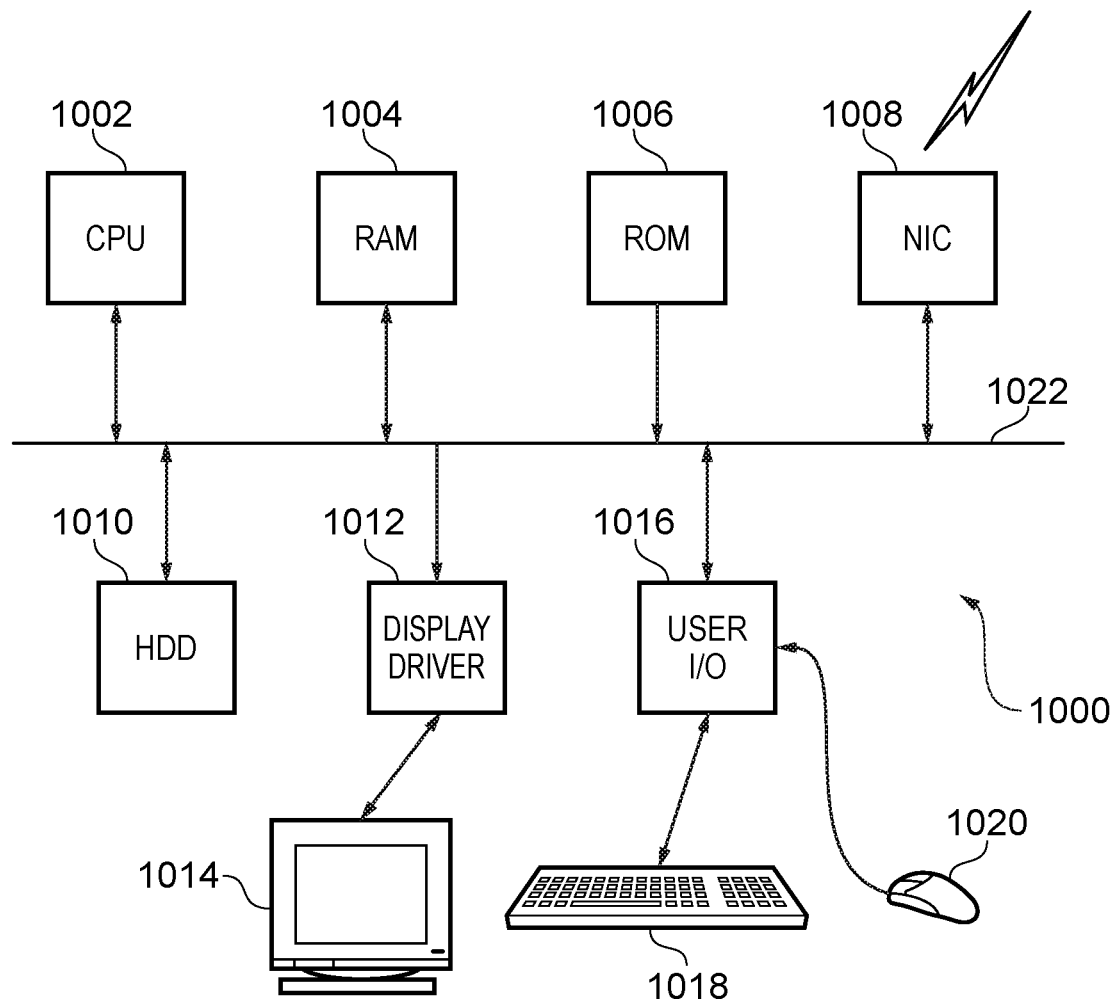
FIG. 10 schematically illustrates a general purpose computing device which may be used to carry out some embodiments.

FIG. 10 schematically illustrates a general purpose computer 1000 of the type that may be used to implement some aspects of the above described techniques. The general purpose computer 1000 includes a central processing unit 1002, a random access memory 1004, a read only memory 1006, a network interface card 1008, a hard disk drive 1010, a display driver 1012 and monitor 1014 and a user input/output circuit 1016 with a keyboard 1018 and mouse 1020 all connected via a common bus 1022. In operation the central processing unit 1002 will execute computer program instructions that may be stored in one or more of the random access memory 1004, the read only memory 1006 and the hard disk drive 1010 or dynamically downloaded via the network interface card 1008. The results of the processing performed may be displayed to a user via the display driver 1012 and the monitor 1014. User inputs for controlling the operation of the general purpose computer 1000 may be received via the user input/output circuit 1016 from the keyboard 1018 or the mouse 1020. It will be appreciated that the computer program could be written in a variety of different computer languages. The computer program may be stored and distributed on a recording medium or dynamically downloaded to the general purpose computer 1000. When operating under control of an appropriate computer program, the general purpose computer 1000 can perform aspects of the above described techniques, such as providing the synthesis tool 902 of FIG. 9, and can be considered to form an apparatus for performing that technique. In such an example the RTL code 901 is then provided as an input to the general purpose computer 1000, for example stored in the hard drive 1010 having been downloaded via the network interface card 1008. The architecture of the general purpose computer 1000 could vary considerably and FIG. 10 is only one example. Alternatively, the above-described techniques may be implemented in a more distributed fashion, wherein the general purpose computer 1000 illustrated in FIG. 10 may be expanded and/or replaced by an infrastructure comprising components implemented on separate physical devices, the separate physical devices sharing the processing required to carry out these techniques. Such separate physical devices may be physically proximate to one another, or may even be located at entirely different physical locations. In some configurations such an infrastructure is termed a 'cloud computing' arrangement.

The techniques described herein thus, inter alia, provide the possibility for the addition of "built-in" instructions (for auxiliary execution circuitry) into the environment of a main CPU. These instructions are decoded by decoding circuitry which otherwise controls the main CPU, and the CPU then manages Read/Write registers, as well as managing control and dependencies. By defining the set of custom instructions within the scope of the main instruction set architecture, major compiler support is provided.

In brief overall summary, data processing apparatuses, methods of data processing, and non-transitory computer-readable media on which computer-readable code is stored defining logical configurations of processing devices are disclosed. In an apparatus, fetch circuitry retrieves a sequence of instructions, and execution circuitry performs data processing operations with respect to data values in a set of registers. An auxiliary execution circuitry interface and a coprocessor interface to provide a connection to a coprocessor outside the apparatus are provided. Decoding circuitry generates control signals in dependence on the instructions of the sequence of instructions, wherein the decoding circuitry is responsive to instructions in a first subset of an instruction encoding space to generate the control signals to control the execution circuitry to perform the first data processing operations, and the decoding circuitry is responsive to instructions in a second subset of the instruction encoding space to generate the control signals in dependence on a configuration condition: to generate the control signals for the auxiliary execution circuitry interface when the configuration condition has a first state; and to generate the control signals for the coprocessor interface when the configuration condition has a second state.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. Apparatus comprising:
    fetch circuitry to retrieve a sequence of instructions;
    execution circuitry to perform first data processing operations;
    an auxiliary execution circuitry interface;
    a coprocessor interface to provide a connection to a coprocessor outside the apparatus; and
    decoding circuitry to receive, at a first input, one or more instructions of the sequence of instructions from the fetch circuitry and to receive, at a further input different from the first input and independent from all inputs from the fetch circuitry, a configuration condition separate from the one or more instructions and separate from the sequence of instructions, and to generate control signals in dependence on the one or more instructions, wherein the decoding circuitry is responsive to instructions of the one or more instructions in a first subset of an instruction encoding space to generate control signals to control the execution circuitry to perform the first data processing operations,
    wherein the decoding circuitry is responsive to instructions of the one or more instructions in a second subset of the instruction encoding space to generate:
        control signals for the auxiliary execution circuitry interface in dependence on the configuration condition being in a first state; and
        control signals for the coprocessor interface in dependence on the configuration condition being in a second state.

2. The apparatus as claimed in claim 1, further comprising:
    register circuitry to hold data values in a set of registers, wherein the execution circuitry is arranged to perform the first data processing operations with respect to the data values in the set of registers; and
    auxiliary execution circuitry, wherein the decoding circuitry is responsive to the instructions of the one or more instructions in the second subset of the instruction encoding space when the configuration condition has the first state to generate the control signals for the auxiliary execution circuitry interface to control the auxiliary execution circuitry via the auxiliary execution circuitry interface to perform second data processing operations with respect to the data values in the set of registers.

3. The apparatus as claimed in claim 2, wherein the second subset of the instruction encoding space is subdivided into a plurality of sub-sections at least when the configuration condition has the first state, wherein for each sub-section there is an invariant instruction profile.

4. The apparatus as claimed in claim 3, wherein the invariant instruction profile comprises one or more of members selected from the group consisting of:
    a type associated with at least one input register;
    a type associated with at least one output register;
    a number of input registers;
    a number of input flags;
    a number of result registers; and
    a number of output flags.

5. The apparatus as claimed in claim 3, wherein the invariant instruction profile comprises one or more of members selected from the group consisting of:
    a position in an instruction of at least one input register specifier;
    a position in the instruction of at least one input flags indicator;
    a position in the instruction of at least one result register specifier; and
    a position in the instruction of at least one output flags indicator.

6. The apparatus as claimed in claim 1, wherein the decoding circuitry is responsive to an instruction of the second subset of the instruction encoding space, when the configuration condition has the first state, to generate the control signals for the auxiliary execution circuitry interface such that the control signals for the auxiliary execution circuitry interface comprise a value indicative of a portion of the instruction.

7. The apparatus as claimed in claim 1, wherein the decoding circuitry is responsive to an instruction of the second subset of the instruction encoding space to generate the control signals for the auxiliary execution circuitry interface such that the control signals for the auxiliary execution circuitry interface comprise a value indicative of a portion of the instruction.

8. The apparatus as claimed in claim 1, further comprising:
register circuitry to hold data values in a set of registers, wherein the execution circuitry is arranged to perform the first data processing operations with respect to the data values in the set of registers;
wherein the configuration condition has the first state or the second state in dependence on at least one data value held in a register of the set of registers.

9. The apparatus as claimed in claim 1, further comprising a configuration value storage, wherein the configuration condition has the first state or the second state in dependence on a configuration value held in the configuration value storage.

10. The apparatus as claimed in claim 9, wherein the configuration value held in the configuration value storage is software-programmable.

11. The apparatus as claimed in claim 1, wherein the configuration condition has the first state or the second state in dependence on an input signal to the apparatus.

12. The apparatus as claimed in claim 11, wherein the apparatus is at least one of:
responsive to the input signal indicating that the coprocessor outside the apparatus is currently busy performing data processing caused by previous control signals for the coprocessor interface; and/or
responsive to the input signal indicating that the coprocessor outside the apparatus is currently not fully powered,
to cause the configuration condition to have the first state.

13. The apparatus as claimed in claim 11, wherein the apparatus is part of a system-on-chip and the apparatus is responsive to a signal indicative that the coprocessor outside the apparatus is currently busy performing data processing caused by further control signals provided by a processor which is part of the system-on-chip to cause the configuration condition to have the first state.

14. The apparatus as claimed in claim 1, wherein the coprocessor interface provides connections to a plurality of coprocessors outside the apparatus,
and wherein the decoding circuitry is responsive to the instructions of the one or more instructions in the second subset of the instruction encoding space to generate the control signals for the coprocessor interface:
to control a first coprocessor of the plurality of coprocessors when the configuration condition has the second state; and
to control a second coprocessor of the plurality of coprocessors when the configuration condition has a third state.

15. The apparatus as claimed in claim 14, wherein the auxiliary execution circuitry interface is a coprocessor interface.

16. The apparatus as claimed in claim 1, wherein the coprocessor interface provides connections to a plurality of coprocessors outside the apparatus,
wherein the second subset of the instruction encoding space is sub-divided into a plurality of sub-regions,
wherein the decoding circuitry is responsive to the instructions of the one or more instructions in the second subset of the instruction encoding space when the configuration condition has the second state to generate the control signals for the coprocessor interface to control a selected coprocessor of the plurality of coprocessors,
and wherein selection of the selected coprocessor is dependent on a sub-region of the plurality of sub-regions and on a sub-region-to-coprocessor mapping stored in the apparatus.

17. The apparatus as claimed in claim 16, wherein the sub-region-to-coprocessor mapping is stored in a configuration register of a configuration store.

18. The apparatus as claimed in claim 17, wherein access to the configuration register of the configuration store is restricted to software executing at least at a defined minimum privilege level.

19. The apparatus as claimed in claim 16, further comprising a mapping storage, wherein the sub-region-to-coprocessor mapping is stored in the mapping storage, wherein the mapping storage has a capacity to store less than a full set of sub-region-to-coprocessor mappings, and the apparatus is responsive to absence of a currently required sub-region-to-coprocessor mapping in the mapping storage:
to cause the currently required sub-region-to-coprocessor mapping to be retrieved from memory to the mapping storage; and/or
to raise an exception.

20. The apparatus as claimed in claim 16, wherein the sub-region-to-coprocessor mapping is process-dependent and/or thread-dependent.

21. A method of data processing comprising:
retrieving a sequence of instructions using fetch circuitry;
receiving, at a first input to decoding circuitry, one or more instructions of the sequence of instructions;
receiving, at a further input to the decoding circuitry different from the first input and independent from all inputs from the fetch circuitry, a configuration condition separate from the one or more instructions and separate from the sequence of instructions; and
generating control signals in dependence on the one or more instructions, wherein in response to instructions of the one or more instructions in a first subset of an instruction encoding space control signals to control execution circuitry to perform data processing operations are generated, and
wherein in response to instructions of the one or more instructions in a second subset of the instruction encoding space:
control signals for an auxiliary execution circuitry interface are generated in dependence on the configuration condition being in a first state; and
control signals for a coprocessor interface are generated in dependence on the configuration condition being in a second state.

22. A non-transitory computer-readable medium configured to store computer-readable code for fabrication of a processing device comprising:
fetch circuitry to retrieve a sequence of instructions;
register circuitry to hold data values in a set of registers;
execution circuitry to perform first data processing operations with respect to the data values in the set of registers;
an auxiliary execution circuitry interface;
a coprocessor interface to provide a connection to a coprocessor outside the processing device; and
decoding circuitry to receive, at a first input, one or more instructions of the sequence of instructions from the fetch circuitry and to receive, at a further input different from the first input and independent from all inputs from the fetch circuitry, a configuration condition separate from the one or more instructions and separate from the sequence of instructions, and to generate control signals in dependence on the one or more instructions, wherein the decoding circuitry is responsive to instructions of the one or more instructions in a first subset of an instruction encoding space to generate control signals to control the execution circuitry to perform the first data processing operations, wherein the decoding circuitry is responsive to instructions of the one or more instructions in a second subset of the instruction encoding space to generate:
control signals for the auxiliary execution circuitry interface to control auxiliary execution circuitry accessed via the auxiliary execution circuitry interface to perform second data processing operations with respect to the data values in the set of registers in dependence on the configuration condition being in a first state; and
control signals for the coprocessor interface in dependence on the configuration condition being in a second state.

23. The non-transitory computer-readable medium of claim 22, wherein the decoding circuitry is arranged to be configured in dependence on the configuration condition during a synthesis process for the fabrication of the processing device.

* * * * *